(12) United States Patent
Kelly

(10) Patent No.: US 9,066,613 B2
(45) Date of Patent: Jun. 30, 2015

(54) THERMAL BARRIER LINER FOR CONTAINERS

(71) Applicant: MillerCoors, LLC, Chicago, IL (US)

(72) Inventor: Jason Morgan Kelly, Arvada, CO (US)

(73) Assignee: MillerCoors, LLC, Chicago, IL (US)

( * ) Notice: Subject to any disclaimer, the term of this patent is extended or adjusted under 35 U.S.C. 154(b) by 0 days.

(21) Appl. No.: 13/871,854

(22) Filed: Apr. 26, 2013

(65) Prior Publication Data

US 2013/0239607 A1 Sep. 19, 2013

Related U.S. Application Data

(60) Division of application No. 13/042,112, filed on Mar. 7, 2011, now Pat. No. 8,448,809, which is a continuation-in-part of application No. 12/249,356, filed on Oct. 10, 2008, now Pat. No. 8,336,729, said (Continued)

(51) Int. Cl.
*B65D 81/18* (2006.01)
*A47G 19/22* (2006.01)
(Continued)

(52) U.S. Cl.
CPC .......... *A47G 19/2288* (2013.01); *B65D 17/165* (2013.01); *B65D 81/18* (2013.01);
(Continued)

(58) Field of Classification Search
CPC .............. A47G 19/2288; B65D 81/18; F25D 2303/0842; F25D 2331/805
USPC ................. 220/62.12, 62.22, 592.01, 592.17, 220/592.2, 592.26, 903; 62/457.2, 457.3, 62/457.9
See application file for complete search history.

(56) References Cited

U.S. PATENT DOCUMENTS

| 2,652,148 A | 9/1953 | Pfeifer |
| 3,494,142 A | 2/1970 | Beck |

(Continued)

FOREIGN PATENT DOCUMENTS

| CN | 1227701 | 9/1999 |
| DE | 9301279 | 4/1993 |

(Continued)

OTHER PUBLICATIONS

"Phase Change Material," Answers.com (Technology), available at http://www.answers.com/topic/phase-change-material-1?cat=technology, printed Aug. 29, 2007, pp. 1-2.

(Continued)

*Primary Examiner* — Jeffrey Allen
*Assistant Examiner* — Madison L Poos
(74) *Attorney, Agent, or Firm* — Sheridan Ross P.C.

(57) ABSTRACT

A thermal barrier maintains a beverage within a container at a desired temperature. The barrier may include gas or liquid filled microcapsules and a base material having microencapsulated solid-liquid phase change material, or combinations thereof. The thermal barrier may include a cooling element attached to the exterior of the container, the interior of the container, or free-floating within the container. Other embodiments include a container holder incorporating phase change materials to control temperature of the beverages. The holder includes enclosing sidewalls and a plurality of cavities to receive one or more containers. Gaps between the cavities and the enclosing sidewalls are filled with phase change materials, such as microencapsulated phase change materials. Another embodiment provides a double walled pitcher with phase change materials and a base material filling the space between the walls. The phase change material and base material sealed between the walls enable the pitcher to be re-used.

3 Claims, 13 Drawing Sheets

Related U.S. Application Data application No. 13/871,854 is a continuation-in-part of application No. 12/249,431, filed on Oct. 10, 2008, now Pat. No. 8,297,072.

(60) Provisional application No. 60/980,127, filed on Oct. 15, 2007, provisional application No. 60/980,197, filed on Oct. 16, 2007.

(51) Int. Cl.
*B65D 17/00* (2006.01)
*G01K 11/12* (2006.01)
*F25D 3/08* (2006.01)
*B65B 3/00* (2006.01)
*F28D 20/02* (2006.01)

(52) U.S. Cl.
CPC .............. *F28D 20/02* (2013.01); *G01K 11/12* (2013.01); *G01K 2207/08* (2013.01); *F25D 3/08* (2013.01); *F25D 2303/0831* (2013.01); *F25D 2303/0841* (2013.01); *F25D 2303/0843* (2013.01); *F25D 2303/0845* (2013.01); *F25D 2303/085* (2013.01); *F25D 2331/805* (2013.01); *F25D 2331/809* (2013.01); *F25D 2331/81* (2013.01); *B65B 3/00* (2013.01)

(56) References Cited

U.S. PATENT DOCUMENTS

| | | |
|---|---|---|
| 3,525,236 A | 8/1970 | Solhkhah |
| 3,645,758 A | 2/1972 | MacManus |
| 3,760,972 A | 9/1973 | McKirnan |
| 3,852,975 A | 12/1974 | Beck |
| 3,913,770 A | 10/1975 | Tarro |
| 4,554,189 A | 11/1985 | Marshall |
| 4,628,703 A | 12/1986 | Kim |
| 4,671,406 A | 6/1987 | Baer |
| 4,736,599 A | 4/1988 | Siegel |
| 4,761,314 A | 8/1988 | Marshall |
| 4,784,678 A | 11/1988 | Rudick et al. |
| 4,802,343 A | 2/1989 | Rudick et al. |
| 4,982,722 A | 1/1991 | Wyat |
| 5,168,708 A | 12/1992 | Siegel |
| 5,400,610 A | 3/1995 | Macedo |
| 5,499,460 A | 3/1996 | Bryant et al. |
| 5,520,103 A | 5/1996 | Zielinski et al. |
| 5,543,186 A | 8/1996 | Andersen et al. |
| 5,637,389 A | 6/1997 | Colvin et al. |
| 5,718,352 A | 2/1998 | Diekhoff et al. |
| 5,762,230 A | 6/1998 | Policappelli |
| 5,928,741 A | 7/1999 | Andersen et al. |
| 5,952,068 A | 9/1999 | Neale et al. |
| 5,997,849 A | 12/1999 | Small et al. |
| 6,065,634 A | 5/2000 | Brifcani et al. |
| 6,103,280 A | 8/2000 | Molzahn et al. |
| 6,109,006 A | 8/2000 | Hutchinson |
| 6,141,970 A | 11/2000 | Molzahn et al. |
| 6,151,911 A | 11/2000 | Dando et al. |
| 6,173,579 B1 | 1/2001 | Davidson |
| 6,341,491 B1 | 1/2002 | Paine et al. |
| 6,387,482 B1 | 5/2002 | Persiani et al. |
| 6,415,940 B1 | 7/2002 | Brabson, II |
| 6,419,108 B1 | 7/2002 | Toida et al. |
| 6,422,024 B1 | 7/2002 | Foye |
| 6,474,498 B1 | 11/2002 | Markham |
| 6,551,638 B1 | 4/2003 | Dodd et al. |
| 6,829,902 B1 | 12/2004 | Claydon |
| 6,852,381 B2 | 2/2005 | Debraal et al. |
| 7,074,466 B2 | 7/2006 | DeBraal et al. |
| 7,124,604 B2 | 10/2006 | Taylor et al. |
| 7,176,426 B2 | 2/2007 | Ramirez |
| 7,431,174 B2 | 10/2008 | Thissen |
| 7,802,446 B2 | 9/2010 | Overgaard |
| 8,096,035 B2 | 1/2012 | Kelly et al. |
| 8,297,072 B2 | 10/2012 | Willcoxen et al. |
| 8,336,729 B2 | 12/2012 | Kelly et al. |
| 2002/0150657 A1 | 10/2002 | Farr et al. |
| 2002/0164474 A1 | 11/2002 | Buckley |
| 2004/0105923 A1 | 6/2004 | O'Connell |
| 2004/0109928 A1 | 6/2004 | O'Connell |
| 2004/0255787 A1 | 12/2004 | Lassota et al. |
| 2005/0147778 A1 | 7/2005 | Tai et al. |
| 2005/0196629 A1 | 9/2005 | Bariatinsky et al. |
| 2005/0199057 A1 | 9/2005 | Hadala |
| 2006/0038293 A1 | 2/2006 | Rueger et al. |
| 2006/0054622 A1 | 3/2006 | Agnello |
| 2006/0063000 A1 | 3/2006 | Tokumura et al. |
| 2006/0073298 A1 | 4/2006 | Hutchinson et al. |
| 2006/0086745 A1 | 4/2006 | Morrison |
| 2006/0147696 A1 | 7/2006 | Crowley |
| 2006/0153956 A1 | 7/2006 | Ullmann |
| 2006/0156756 A1 | 7/2006 | Becke |
| 2006/0182165 A1 | 8/2006 | Tapelt-Glaser |
| 2006/0182372 A1 | 8/2006 | Fadal et al. |
| 2006/0185372 A1 | 8/2006 | Conde Hinojosa |
| 2006/0186125 A1 | 8/2006 | Tew |
| 2006/0249949 A1 | 11/2006 | Fortune |
| 2006/0280843 A1 | 12/2006 | Jager et al. |
| 2007/0000484 A1 | 1/2007 | Magill et al. |
| 2007/0059837 A1 | 3/2007 | Heilmann et al. |
| 2007/0071680 A1 | 3/2007 | Ribi |
| 2007/0212501 A1 | 9/2007 | Wolfe et al. |
| 2008/0271476 A1 | 11/2008 | Langguth |
| 2009/0305397 A1 | 12/2009 | Dodgson et al. |
| 2011/0185764 A1 | 8/2011 | Kelly |

FOREIGN PATENT DOCUMENTS

| | | |
|---|---|---|
| EP | 0931998 | 7/1999 |
| EP | 1714912 | 10/2006 |
| EP | 1780147 | 5/2007 |
| FR | 1465643 | 3/1967 |
| GB | 2260747 | 4/1993 |
| GB | 2347202 | 8/2000 |
| GB | 2365106 | 2/2002 |
| GB | 2370629 | 7/2002 |
| JP | 2007-090071 | 4/2007 |
| NL | 1008322 | 8/1999 |
| WO | WO 95/04709 | 2/1995 |
| WO | WO 97/24968 | 7/1997 |
| WO | WO 2004/022435 | 3/2004 |
| WO | WO 2004/037888 | 5/2004 |
| WO | WO 2005/102668 | 11/2005 |

OTHER PUBLICATIONS

"Encapsulated Phase Change Materials," microtek Laboratories, Inc., available at http://www.microteklabs.com/phasechange.html, printed Aug. 29, 2007, 1 page.

"Micro PCM's," microtek Laboratories, Inc., available at http://www.microteklabs.com/micropcm.html, printed Aug. 29, 2007, 1 page.

"n-Paraffin Technical Data Sheet (Complex Normal Paraffin)," microtek Laboratories, Inc., available at http://www.microteklabs.com/table.html, printed Aug. 29, 2007, 1 page.

International Search Report for International (PCT) Patent Application No. PCT/US08/79686, mailed Dec. 12, 2008.

Written Opinion for International (PCT) Patent Application No. PCT/US08/79686, mailed Dec. 12, 2008.

International Preliminary Report on Patentability for International (PCT) Patent Application No. PCT/US08/79686, mailed Apr. 29, 2010.

International Search Report for International (PCT) Patent Application No. PCT/US08/79685, mailed Dec. 16, 2008.

Written Opinion for International (PCT) Patent Application No. PCT/US08/79685, mailed Dec. 16, 2008.

(56) References Cited

OTHER PUBLICATIONS

International Preliminary Report on Patentability for International (PCT) Patent Application No. PCT/US08/79685, mailed Apr. 29, 2010.

International Search Report for International (PCT) Patent application No. PCT/US12/21415, mailed Jun. 5, 2012 4 pages.

Written Opinion for International (PCT) Patent application No. PCT/US12/21415, mailed Jun. 5, 2012 6 pages.

European Search Report for European Patent Application No. 08840154.2, dated Sep. 22, 2014, 9 pages.

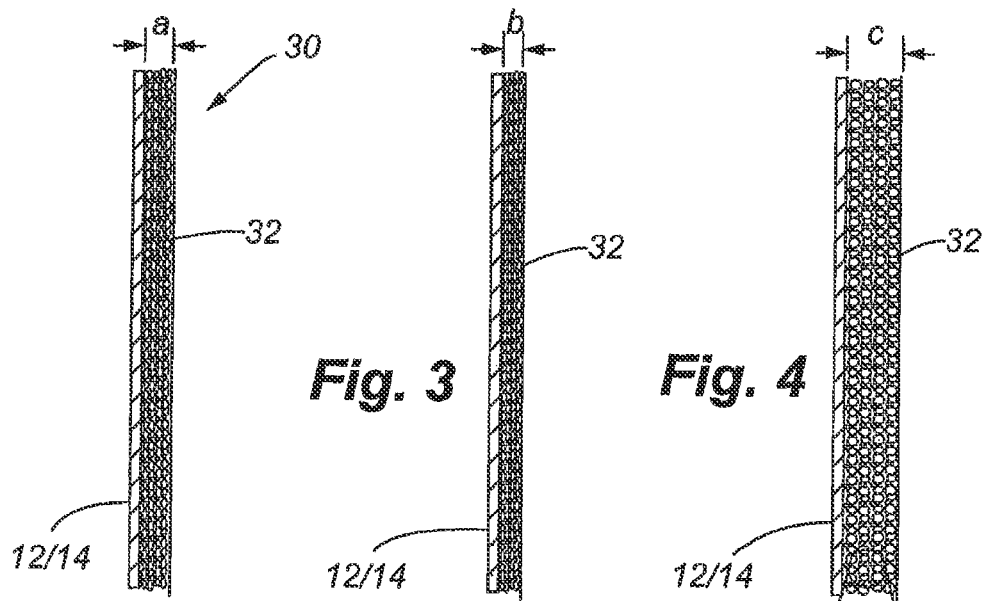
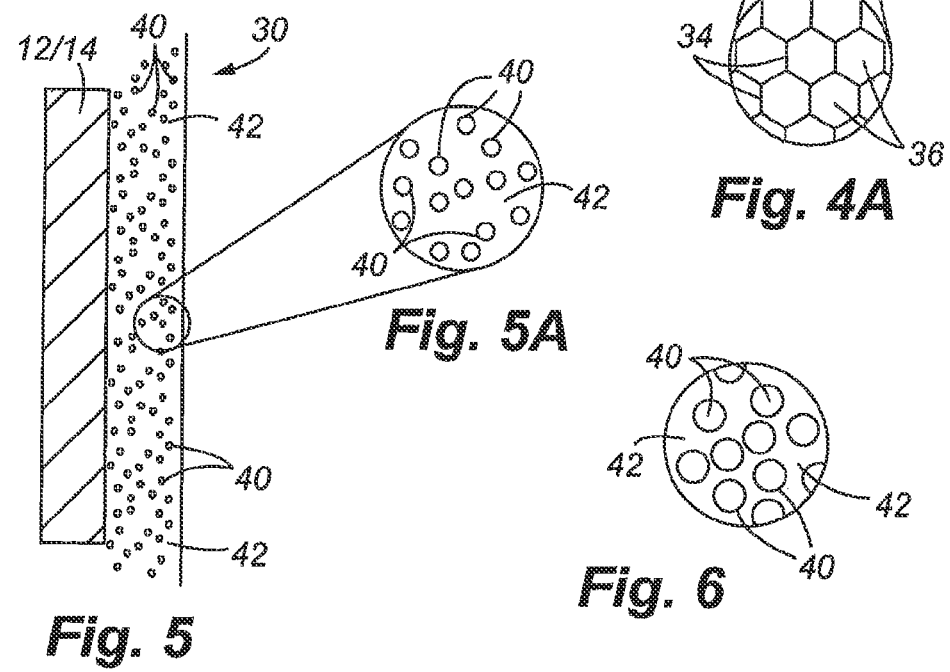

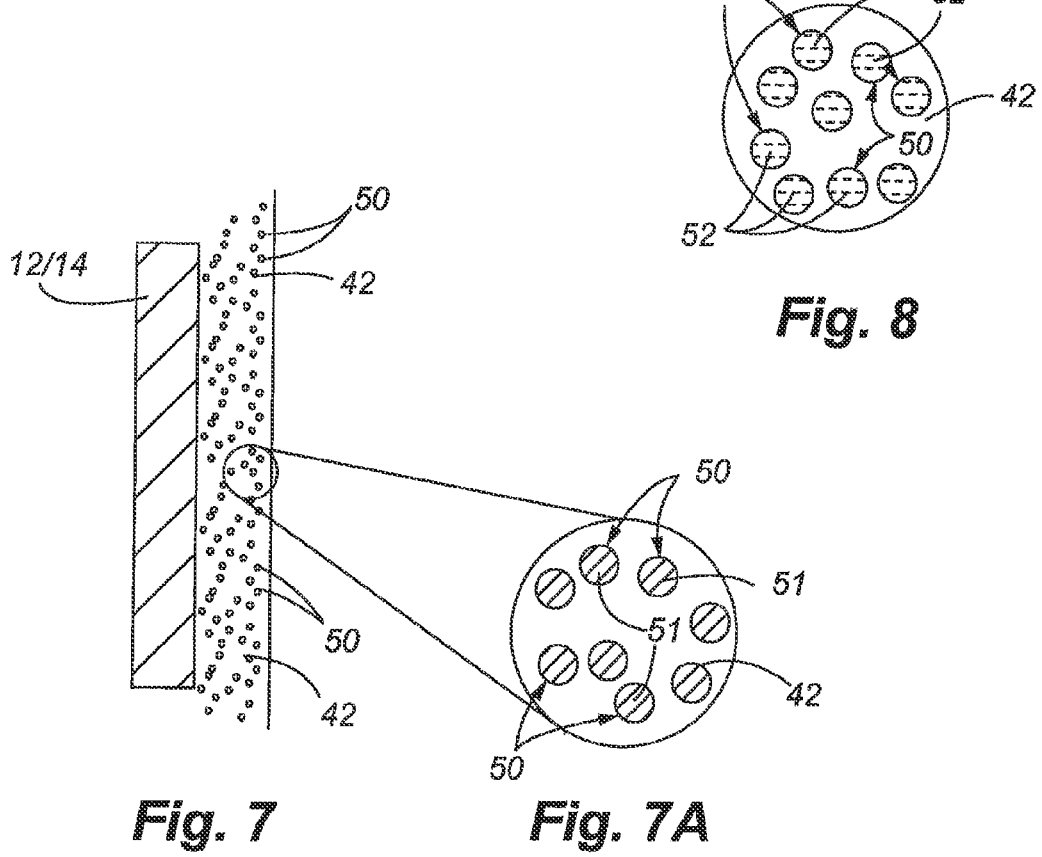

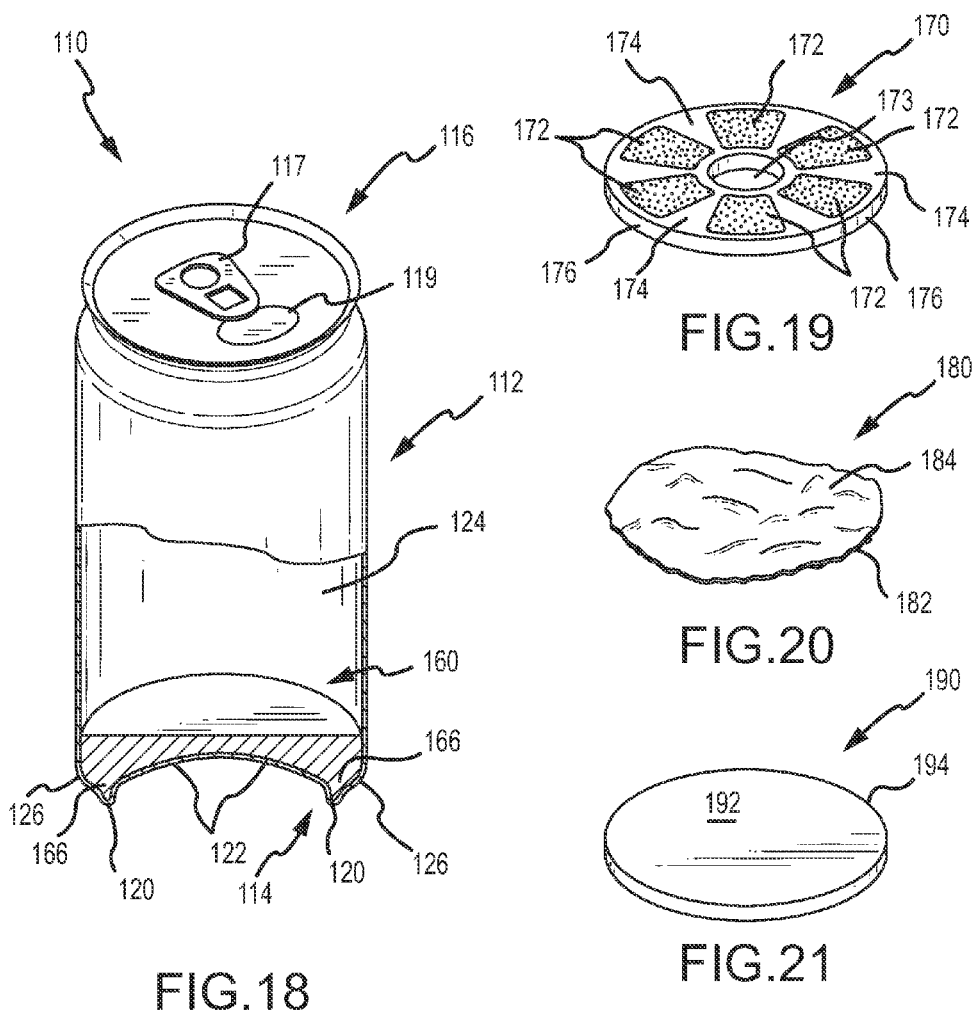

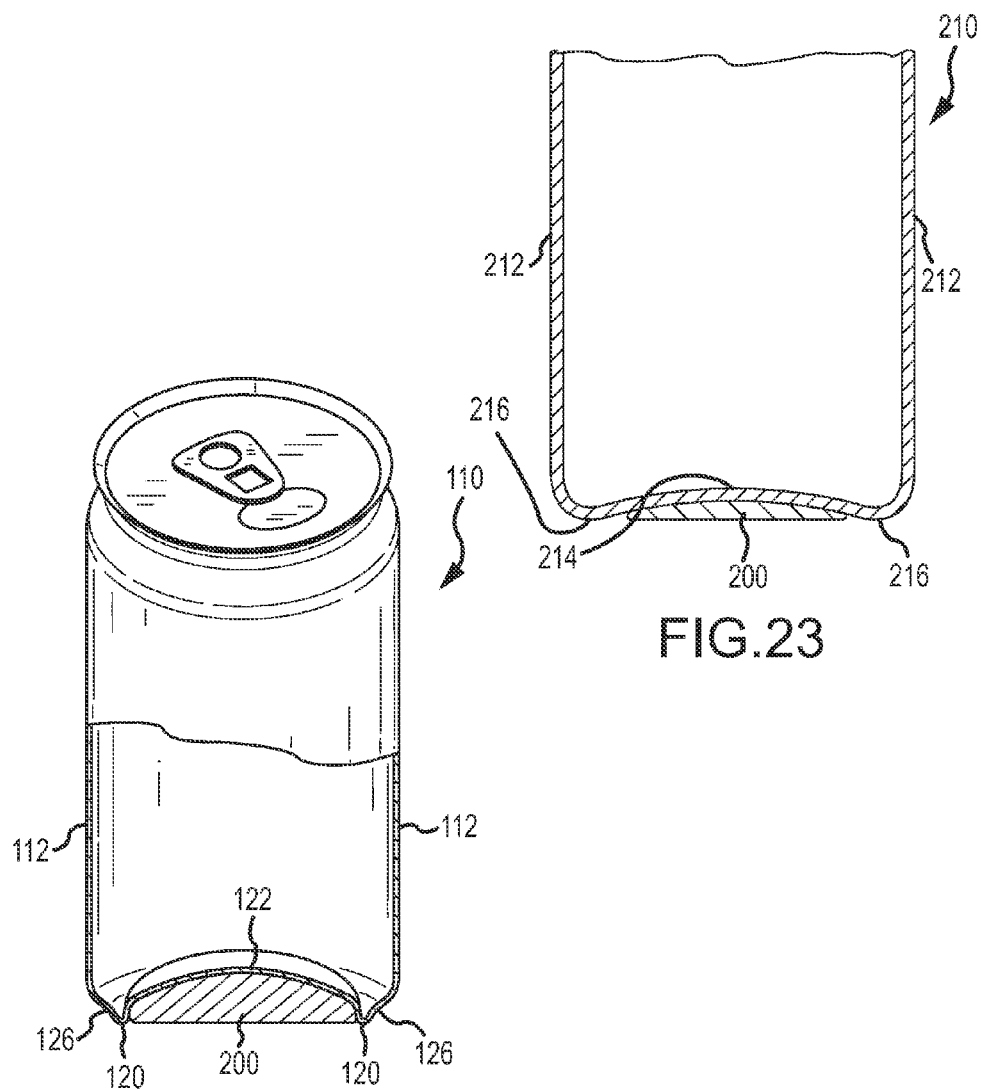

THERMAL BARRIER LINER FOR CONTAINERS

CROSS REFERENCE TO RELATED APPLICATIONS

This application is a divisional application of U.S. patent application Ser. No. 13/042,112 entitled "THERMAL BARRIER LINER FOR CONTAINERS," which is a continuation in part application of U.S. patent application Ser. No. 12/249,356, entitled: "THERMAL BARRIER LINER FOR CONTAINERS," now U.S. Pat. No. 8,336,729, which claims priority from the U.S. Provisional Patent Application No. 60/980,127 filed on Oct. 15, 2007 and entitled "THERMAL BARRIER LINER FOR CONTAINERS", the disclosures of which are incorporated herein by reference in their entirety.

This application is also a continuation in part application of U.S. patent application Ser. No. 12/249,431 entitled "CONTAINER INCORPORATING INTEGRAL COOLING ELEMENT," now U.S. Pat. No. 8,297,072 which claims priority from the U.S. Provisional Patent Application No. 60/980,197 filed on Oct. 16, 2007 and entitled "CONTAINER INCORPORATING INTEGRAL COOLING ELEMENT," the disclosures of which are also incorporated herein by reference in their entirety.

FIELD OF THE INVENTION

The present invention relates to a thermal barrier liner for containers, and more particularly, to a thermal barrier liner formed on the inner surface of the container and a method of applying the liner by spray coating.

BACKGROUND OF THE INVENTION

Portable beverage containers are used to hold many types of beverages to include carbonated soft drinks, fruit drinks, and beer. It is well known to provide a protective internal liner for those containers made of metal such as aluminum or steel to help preserve the beverage within the container by preventing undesirable chemical reactions that would otherwise take place over time by direct contact of the beverage with the metallic container. For containers made of plastic, there is typically no internal liner provided because the plastic material is inherently non-reactive with respect to most types of beverages.

Many beverages are preferably consumed at relatively cold temperatures, for example, between about 36° F. and 50° F. For carbonated soft drinks and beer, consumers typically prefer these beverages to be chilled prior to consumption. Traditional chilling or cooling techniques include placing the containers in a chilled environment such as a refrigerator or cooler, and then serving the beverage once the beverage has reached a desired chilled temperature.

When the beverage is removed from the chilled environment, the beverage begins to quickly warm due to a combination of external heat sources including ambient heat of the surrounding environment, contact with warm surfaces such as the consumer's hand or the surface on which the container is placed, as well as radiant heat from the sun or other light sources. Heat transfer takes place through the walls, base, and top of the container to the beverage. Without some means provided for insulating the container, the beverage so quickly warms that, in many circumstances, it becomes undesirable or unfit for consumption.

There are a number of inventions that have been developed for purposes of insulating a beverage within the container such that it is maintained at a desired temperature prior to consumption. For example, it is well known to provide external thermal barriers, such as an insulating sleeve that is applied over the exterior sidewall of the container. It is also known to provide an insulated label on the sidewall of the container. There are a number of disadvantages to these traditional methods of insulating beverages. An insulating label/sleeve only covers the container sidewall, therefore leaving the bottom of the container exposed. For insulated labels, they are typically much thicker than a non-insulated label and, therefore, standard packaging line may have to be substantially modified to accommodate these special labels. For insulating sleeves, these require the consumer to maintain a separate component to maintain the beverage at a desired cold temperature.

Some efforts have been made to provide an internal insulating liner for containers. One example is disclosed in U.S. Pat. No. 6,474,498. This reference discloses a thermally insulated container for canned beverages including a lining formed from a plastics material. The preferred embodiments suggest using a plastic closed cell material to include closed cell material similar to bubble wrap. The liner is intended to be placed into the container as by a slidable fit within the container so as to be in contact with the cylindrical inner surface of the container wall. The lining member may include an adherent surface allowing the lining to adhere to the internal wall of the container. In an alternative embodiment, this reference discloses a closed cell material that can be provided as a layer on the interior surface of the metal container in addition to or in place of a conventional lacquered coating applied to the interior surface of the container.

U.S. Patent Application Publication No. 2006-0073298 discloses a multi-layer inner liner provided for a container and an extrusion method for a beverage container. The method contemplates blow molding the inner liner by co-extrusion of a first inner layer of a thermoplastics material and a second inner layer made of a foam material having insulating properties. The inner layer of foam is further disclosed as having micro-spheres that expand during the blow-molding process.

U.S. Patent Application Publication No. 2006-0054622 discloses an insulated beverage container having an inner liner that adheres to the inside of the container. The inner liner is made from a crystalline ceramic material.

In addition to externally mounted sleeves and internal liners, some efforts have also been made to maintain beverages at a desired temperature by use of phase change material that is placed within the container. Upon warming, the phase change material changes phase to help maintain the beverage at a cooler temperature for a period of time in which the consumer would normally consume the beverage.

Phase change materials are substances with a high heat of fusion. These materials are capable of storing or releasing large amounts of energy. Phase change materials used for containers are solid/liquid change phase materials wherein the phase change material changes phase from solid to liquid at the material's melting point. More specifically, when the beverage is maintained in a chilled environment below the melting or phase change temperature, the phase change material remains in a solid state. When the container is removed from the chilled environment during consumption of the beverage, the phase change material absorbs a relatively large amount of heat without a significant rise in temperature. Thus, phase change material absorbs heat from the surrounding beverage in the container thereby keeping the beverage at the preferred drinking temperature longer.

One reference disclosing use of phase change material in a container includes the British Patent GB2370629. A phase change material is contained in a small chamber such as a tube placed inside the container. The phase change material is activated when the user opens the can. The phase change material is preferably a liquid, such as water, that boils or vaporizes in the tube. A lower pressure area or vacuum in the tube allows the phase change material to vaporize. Upon vaporization, heat is transferred from the beverage to the tube containing the phase change material.

International Publication WO9724968 discloses a self-cooling food or beverage contained in which a phase change capsule, when activated, results in heat exchange contact with the surrounding or adjacent food or beverage container.

U.S. Patent Application Publication No. 2006/0156756 discloses a self-cooling food or beverage container wherein the container has inner and outer walls and phase change material is located in the space between the walls.

While the foregoing references may be adequate for their intended purpose, there is still a need for providing a cooling element that can be used with a container wherein the cooling element can be easily incorporated into standard manufacturing and production lines without significant alteration to these processes. Furthermore, there is still a need to provide a cooling element for a container wherein the cooling element can be manufactured and installed at a relatively low cost so that the ultimate retail price of a container is still competitive with containers not incorporating cooling capabilities.

There is also a need for an internal thermal barrier to maintain a beverage at a desired temperature wherein the thermal barrier can be incorporated within a liner applied using standard packaging machinery. Further, there is a need to provide a thermal barrier liner for a container wherein the barrier liner can be expanded to cover not only the container sidewall, but also the bottom of the container.

SUMMARY OF THE INVENTION

It is one object of the invention to provide a thermally insulated beverage container that can effectively and safely keep beverages at a desired temperature during consumption of the beverage.

It is yet another object of the present invention to provide a thermally insulated beverage container by providing a thermal barrier liner utilizing a single material that exhibits specific common desirable properties resulting in creation of an insulated thermal barrier.

It is yet another object of the present invention to provide a unique combination of materials that, when combined, exhibit desirable thermal barrier properties.

It is yet another object of the present invention to provide a method of installing a thermal barrier, such as a spray coated liner.

It is yet another object of the present invention to provide a thermal barrier that may be applied to different types of beverage containers, such as those made from metal or made from plastic.

It is yet another object of the present invention to provide a thermally insulated beverage container that can be introduced into existing beverage manufacturing, distribution, and sales sectors without requiring significant alterations in manufacturing machinery or processes.

It is yet another object of the present invention to provide a beverage container with an integral cooling element that can effectively and safely maintain a beverage at a desired temperature during consumption of the beverage.

It is yet another object of the present invention to provide a cooling element incorporated within a beverage container wherein the cooling element can be added to the container without substantially modifying standard manufacturing and production processes.

It is yet another object of the present invention to provide a cooling element for a beverage container that may be applied to many different types of beverage containers, such as those made from metal or plastic.

It is yet another object of the present invention to provide a cooling element that can be placed within the container having a relatively small size that takes up a minimum volume within the container. The cooling element therefore preferably has a minimum profile that is not intrusive to a user who consumes the beverage.

In accordance with a first aspect of the present invention, a thermally insulated beverage container is provided having a thermal barrier liner formed on the inner surface of the container. The container of the present invention may include any known beverage container, such as those made from aluminum or steel that holds beverages such as beer or carbonated soft drinks. The container of the present invention may further include known plastic containers, such as PET bottles or cans.

In one embodiment, the thermal barrier liner may include use of a single material having a cell structure comprising a plurality of voids or pockets and wherein the liner covers the interior surface of the container to include the container sidewall and base of the container. In this embodiment, the liner may also be referred to as a closed cell substrate layer or foam layer. The material used for the barrier liner in this embodiment has a stretchable or elastic capability such that the voids may increase in physical size without rupturing. The particular liner material and manner of applying the liner can be selected such that the cell sizes create a thermal barrier liner of a desired thickness when the container is opened. The thickness of the barrier liner as well as the composition of the barrier liner in terms of the amount of void spaces within the liner can also be adjusted to optimize the thermal barrier liner for purposes of insulating the beverage. The thermal barrier liner may be made from a cavitated monolayer film substrate containing gas permeable closed cells.

In other embodiments, the thermal barrier liner includes a base material containing encapsulated gases or phase change materials. The encapsulated gases or phase change materials are dispersed throughout the base layer. The base layer is monolithic and the liner is preferably applied by spraying as discussed further below.

In yet further embodiments of the present invention, the thermal barrier liner includes a combination of materials that, when combined, exhibit thermal barrier properties. This embodiment may be referred to as a composite liner including a combination of: (i) a cell structure comprising a plurality of voids or pockets; (ii) encapsulated gases; and/or (iii) encapsulated phase change materials. In this embodiment, the base material is also preferably applied by spray coating the interior of the container. One or more spray coating layers can be applied in a single or multi stage spray application.

In yet another embodiment of the present invention, a thermal barrier liner may be provided in the form of a multi-layer coating construction wherein voids or gas pockets are found between the layers thereby providing an effective thermal barrier. In this embodiment, a co-extrusion lamination process can produce the multi-layer coating where portions of adjacent layers are sealed to one another while other portions are not sealed thus creating the gas pockets or void areas between the layers.

In yet another aspect of the present invention, a method is provided for applying the thermal barrier liner to the interior surface of a beverage container utilizing a spray coating technique and wherein temperature, viscosity, and atomization of the coating may be varied to create a desired thermal barrier liner.

The thermal barrier liner in one of the embodiments is gas permeable thus having the ability to equilibrate with ambient pressure conditions. More specifically, during the application of the liner to the container, the voids or pockets formed in the liner will contain gas of the surrounding environment, and the ambient pressure will determine the void sizes. After the container has been filled and sealed, the interior of the container develops a higher pressure in which the void areas further fill with gas contained in the container, such as carbon dioxide or nitrogen. This gas can reside either in the headspace or can be gas dissolved in the beverage. Since the container is under pressure, the voids may decrease in size as compared to the size of the voids under ambient pressure conditions, however, the voids will contain a greater amount of gas due to the higher pressure conditions in which equilibrium is reached and pressure across the liner is equal. The voids fill with the gas(es) over a relatively short period of time due to the gas permeable nature of the liner material.

Once the container is opened, the thermal barrier liner transitions to equilibrium with ambient pressure wherein the pressurized gas contained within the voids causes an immediate expansion of the size of the voids. The increased size of the voids creates a thickened liner that is an effective thermal barrier liner to maintain beverage at a desired temperature.

It is also contemplated within the present invention that the thermal barrier liner can also serve as the standard protective liner used to prevent direct contact between the beverage and the metallic internal surface of the container. It is also contemplated that the thermal barrier liner can also be directly applied over a standard protective liner, thus not replacing the standard liner.

In another aspect of the invention, a beverage container is provided with a cooling element that is capable of keeping the container at a desired chilled temperature after the container has been removed from a chilled environment. The cooling element makes use of solid/liquid phase change material contained within an outer protective shell to prevent contact of the phase change material with the beverage within the container. In the chilled environment, the phase change material is in a solid phase. When the container is exposed to the warmer environment, the phase change material absorbs heat during its phase change, keeping the surrounding beverage at a cooler temperature over a longer period of time as compared to the temperature of the beverage without use of the phase change material.

In another preferred embodiment, the cooling element is sized to fit within the open top of an unfinished container and the cooling element has features that allow the cooling element to be secured to the bottom or side of the container without use of an adhesive. In yet another embodiment of the present invention, the cooling element includes phase change material encapsulated within a flexible plastic film pouch or bag, and the particular size and shape of the film covering can be adapted for use with many different types of containers.

One preferred type of phase change material includes a paraffin wax compound having a phase change transition temperature at 6° C. The phase change material is maintained in a solid state when the beverage is chilled below its melting temperature. When the container is removed from the chilled environment, the phase change material absorbs heat from the beverage within the container during the phase change thereby maintaining the temperature of the beverage cooler.

While a paraffin wax type phase change material is acceptable for use in the present invention, other phase change materials may be used to include other wax derivatives or hydrated solids. Further, phase change materials may be provided in combinations wherein the respective melting point temperatures of the phase change materials are different. Accordingly, the cooling element provides cooling of the surrounding beverage over a longer period of time after the beverage continues to warm in response to exposure to the warmer environment.

Preferably, the cooling element is relatively small and therefore does not materially affect the amount of beverage that can be placed within standard sized containers. The volume of the cooling element can be compensated for by slightly reducing the amount of headspace and/or the volume of the beverage within the container.

As discussed further below, the cooling element may be secured to the base of the container thereby minimizing the consumer's ability to observe the cooling element. In some instances, a consumer may dislike viewing the cooling element that otherwise distracts the consumer's ability to fully enjoy the beverage. The presence of the cooling element may be viewed as an undesirable foreign article in the beverage if it interferes with the consumer's normal interaction with the container.

In yet another embodiment of the present invention, the cooling element, including the phase change material is attached externally to the container. For a metallic can, the cooling element is preferably secured under the container and attached to the dome. For a bottle, the cooling element is also preferably secured to the bottom side of the container in the concave gap formed at the base of the bottle.

In yet another embodiment of the present invention, it is contemplated that the thermal barrier liner may be used in combination with thermochromatic ink. In this combination, the thermochromatic ink provides an indication of the temperature of the container viewable by the consumer. In one preferred embodiment, the thermochromatic ink is provided as a separate layer as compared to the thermal barrier liner. For example, the thermochromatic ink can be applied directly to the exterior surface of the container, and the thermal barrier liner is then applied over the thermochromatic ink layer. In another embodiment, it is the thermal barrier liner that is secured directly to the external surface of the container, and the thermochromatic ink is applied over the thermal barrier liner. In yet another embodiment, the thermal barrier liner and thermochromatic ink are provided in a combined single layer.

In yet another aspect of the present invention, packaging is provided for the container in which phase change materials are incorporated between layers in the packaging in order to help maintain the containers at a desired temperature. In one preferred embodiment, the packaging comprises a reusable container holder that has a plurality of openings to receive containers therein. The reusable holder is made from, for example, corrugated materials such as cardboard in which the phase change material fills gaps between layers of the corrugated material. In yet another embodiment, it is contemplated that the reusable container holder may be constructed from a clear or translucent material, and the phase change material filling gaps between layers of the holder are combined with thermochromatic ink. The thermochromatic ink can be selected to provide a pleasing visual appearance to the consumer, and the thermochromatic ink also provides temperature indication thereby prompting the consumer to re-chill the container holder as necessary.

Other features and advantages of the present invention will become apparent from a review of the following detailed description, taken in conjunction with a review of the drawings.

BRIEF DESCRIPTION OF THE DRAWINGS

FIG. 2 is an enlarged fragmentary cross section view of the thermal barrier liner of the present invention in a first embodiment characterized by a closed cell substrate layer or foam layer;

FIG. 3 is another enlarged fragmentary cross section of the embodiment of FIG. 2 showing the closed cell substrate layer after the container has been sealed and pressurized;

FIG. 4 is another enlarged fragmentary cross section view of the first embodiment after the container has been opened resulting in expansion of the liner;

FIG. 4A is a greatly enlarged view of a portion of FIG. 4 showing the structure of the substrate layer after the container has been opened;

FIG. 5 is an enlarged fragmentary cross section of a barrier liner in another embodiment of the present invention comprising microcapsules containing encapsulated gas or liquid embedded in a base liner material sealed and pressurized;

FIG. 5A is a greatly enlarged view of a portion of FIG. 5 showing the barrier liner and the gas or liquid filled microcapsules;

FIG. 6 is a greatly enlarged view of the portion of FIG. 5 when liquid filled microcapsules are used and undergo a phase change to a gas upon warming and wherein the microcapsules expand in the gaseous state;

FIG. 7 is an enlarged fragmentary cross section view of a thermal barrier liner in another embodiment of the present invention comprising encapsulated solid phase change materials incorporated within a base liner and showing the thermal barrier liner when the container is sealed and pressurized;

FIG. 7A is a greatly enlarged view of a portion of FIG. 7 showing the barrier liner and the encapsulated solid phase change material within the microcapsules;

FIG. 8 is another greatly enlarged view of the embodiment of FIG. 7 when the container has been opened and the beverage has warmed to the phase change temperature, showing the phase change material in the microcapsules being in a liquid state after the phase change;

FIG. 18 is a fragmentary perspective view of a container incorporating a cooling element in accordance with another embodiment of the present invention wherein the cooling element more fully conforms to the bottom portion of the container;

FIG. 19 is perspective view of another cooling element in accordance with another embodiment of the present invention;

FIG. 20 is a perspective view of yet another cooling element in accordance with another embodiment of the present invention;

FIG. 21 is a perspective view of yet another cooling element in accordance with another embodiment of the present invention;

FIG. 22 is a fragmentary perspective view of a container incorporating a cooling element in accordance with another embodiment of the invention wherein the cooling element is secured to the exterior bottom surface of a can;

FIG. 23 is a another fragmentary perspective view of a container incorporating a cooling element wherein the cooling element is secured to an exterior bottom surface of a bottle;

DETAILED DESCRIPTION

Figure 1:
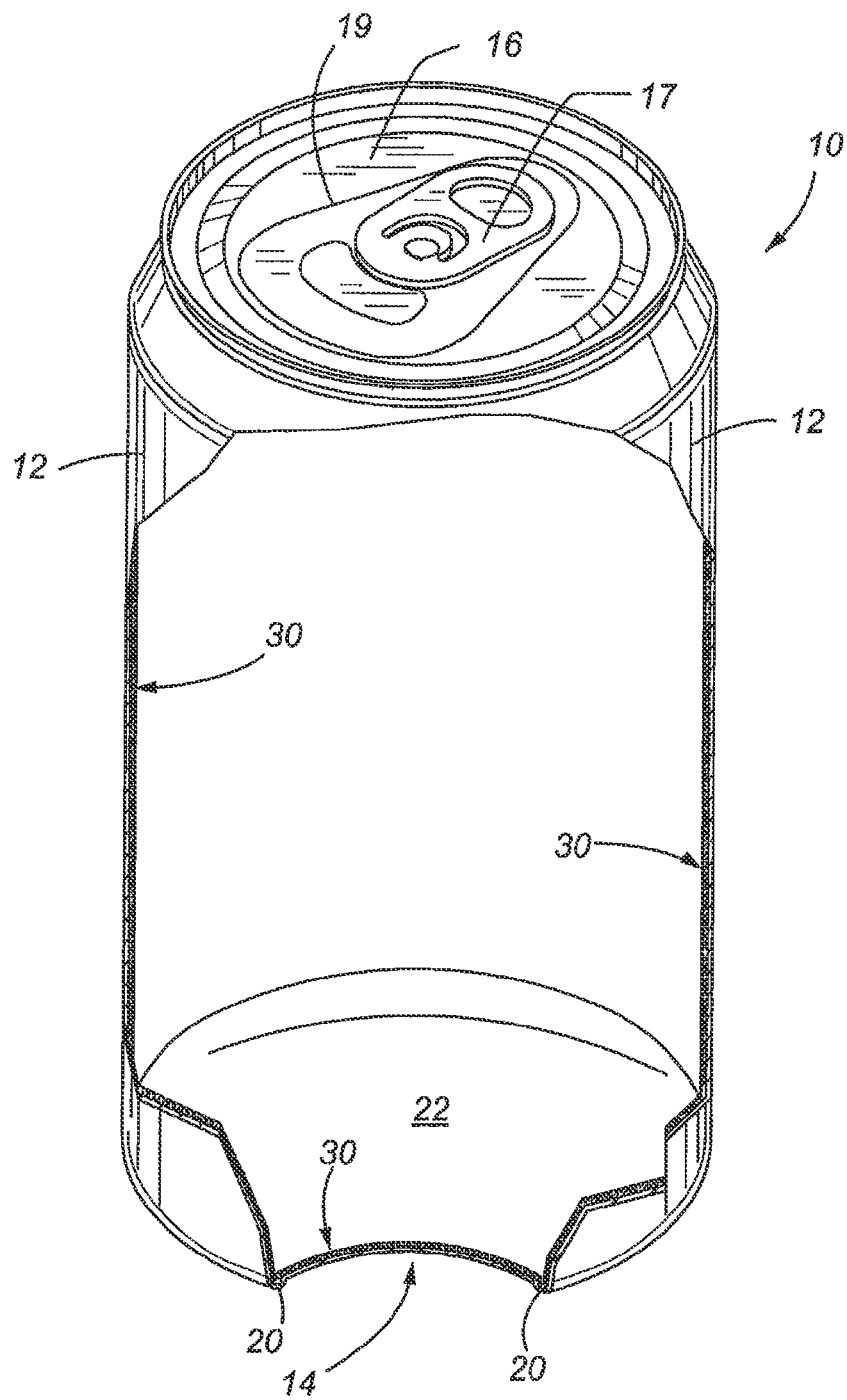
FIG. 1 is a fragmentary perspective view of a beverage container incorporating a thermal barrier liner of the present invention.

With reference to the drawings, FIG. 1 shows a beverage container 10, particularly suited for beverages such as beer or carbonated soft drinks, fruit drinks, and like. The container is illustrated as a conventional beverage can having a sidewall or body 12, a base 14, and an openable top 16. The openable top 16 may include a closure mechanism, such as a pull-tab 17. The sidewall or body of the container is constructed of conventional materials such as aluminum or steel. The openable closure mechanism 17 is also preferably aluminum or steel and may include the pull-tab 17 that contacts a scored area 19 on the top 16. Activation of the pull-tab 17 breaks the scored area 19 creating an opening or mouth to provide access to the beverage inside the container. As also shown in FIG. 1, the conventional container may include the bottom or base 14 having an annular lip 20 and a dome shaped panel 22.

In accordance with one embodiment of the present invention, a thermal barrier liner 30 is provided as shown in FIGS. 1-4. The thermal barrier liner in this first embodiment comprises a gas permeable closed cell substrate 32. The substrate 32 is secured to the interior surface of the container. The gas permeable closed cell substrate includes a pattern of cells 34 defining a plurality of voids, gaps, or open spaces 36 thereby providing the appearance of a foam layer. FIG. 2 illustrates the substrate 32 after the substrate has been applied to the interior surface of the container. As discussed further below, the substrate 32 may be applied by spray coating. The voids or gaps may be of an irregular pattern and the voids or gaps may be of different sizes and shapes. In one aspect of the first embodiment, the thermal barrier liner material may be made from a homogenous material. In another aspect of this embodiment, the thermal barrier liner may include a combination of materials. In either case, the liner is gas permeable and the cells 34 have walls that are elastic/elastomeric such that the overall size of each of the voids/gaps 36 can change according to ambient pressure conditions.

The arrangement and size of the voids/gaps 36 may be a result of either how the liner 30 is applied, and/or may be created during a curing process wherein the voids/gaps form over a period of time. The void areas may be randomly dispersed and randomly sized. However, depending upon the material used as the liner, a more orderly cellular pattern may result. The percentage of void or open cell space volume can range between about 10 to about 95 percent of the overall volume of the thermal barrier liner.

One important attribute of the substrate 32 is that it be gas permeable such that when placed under pressure, the substrate will equilibrate resulting in a substantially uniform distribution of gas within the voids 36. Furthermore, when pressure is reduced, the substrate should have the capability to expand such that the cell walls 34 do not burst, tear, or otherwise degrade and, rather, will maintain an inflated state for a period of time thus creating an effective thermal barrier liner realized by the increased volume of the substrate 32.

It has been found through testing that some existing container liner materials have the capability to be formed into foamed substrates and are elastic such that the substrate maintains integrity among various pressure ranges. However, in order to create the closed cell substrate configuration and necessary gas permeability, foaming agents are added to the liner materials. Two known liner materials may include Valspar 9823-001, or ICI 640-C692CLS. When combined with the appropriate foaming agents, these liner materials may be applied to the interior surface of the container to form a thermal barrier liner having a gas permeable closed cell substrate configuration that is able to equilibrate at working pressure changes.

Referring to FIG. 3, this figure represents how the barrier liner 30 appears when the container has been sealed and pressurized. As shown, the overall thickness of the barrier liner reduces in response to the increased internal pressure within the container. Accordingly, FIG. 2 shows a thickness "a" of the liner that may be somewhat larger than the thickness "b" of the liner when the container is sealed and pressurized. For carbonated beverages, carbon dioxide is the primary gas that fills the container under pressure. Accordingly, the substrate must be permeable to allow passage of the carbon dioxide if used with such carbonated beverages. Within a period of time, the thermal barrier liner will allow passage of the pressurized gas within the container such that the substrate is fully entrained with the pressurized gas. Optionally, liquid nitrogen may be added to the beverage just before sealing to assist in pressure development. In most container filling processes, the end or cap of the container is not attached to the body of the container until the beverage has been added to the container. When the end or cap is attached, a seal is created thus preventing liquid or gas from escaping. Pressure within the container will increase due to a number of factors such as carbonization within the beverage, any added liquid such as nitrogen that will transition to a gas phase, and pasteurization of the beverage by heat treatment. As the thermal barrier liner becomes entrained with the gas, the liner will de-compress as it equilibrates with the internal gas pressure, some reduction in the area of the headspace of the container may occur by thickening of the liner due to entrainment of the pressurized gas into the liner after the container has been sealed and pressurized. However, normal levels of container pressurization do not have to be significantly altered to account for presence of the liner since the liner, even in its fully gas entrained state after sealing and pressurization, takes up a minimum volume within the container.

The thermal barrier liner is preferably of a thickness under ambient pressure conditions such that it does not unduly displace the typical amount of the beverage within the container. Thus when the barrier liner expands under ambient pressure conditions, the beverage in the container will not be forced through the opening in the container.

Referring to FIG. 4, this figure represents the point in time when the container has been opened. In response to the reduction in ambient pressure, the cells 34 expand in size to reach equilibrium. Thus, the thickness "c" of the liner is greater than both the thicknesses "a" and "b". The cells maintain this expanded state for a period of time thus providing an effective thermal barrier liner to maintain the beverage at a desired temperature. Typically, the pressure within the container prior to opening is 10 to 35 psi, depending upon carbon dioxide and nitrogen levels and temperature of the beverage. By expanding the overall thickness of the barrier liner 30, and without otherwise altering the dimensions of the container or any other parameters, the thermal barrier liner is enhanced simply by the ambient pressure changes between the unopened and opened container.

An added benefit with respect to this embodiment is that when the container is being chilled (when unopened) fast chilling of the beverage may take place since the thermal barrier liner is in its more compressed or thin state, thereby allowing rapid heat transfer away from the container without having to overcome a relatively thickened insulating member.

The permeability of the thermal barrier liner is such that gas is allowed to permeate through the cell walls over a period when under pressure to reach equilibrium, for example, a few hours, but the cell walls are not so permeable that immediate deflation takes place when ambient pressure is reduced. Therefore, the thermal barrier liner will maintain a full thickness for at least a period of time in which a consumer would normally consume the beverage. It is contemplated that it may take up to twenty-four hours for pressurized gas within the container when the container is sealed to permeate through the thermal barrier liner but when the container is opened, it will take at least one hour before the thermal barrier liner reaches equilibrium with the reduced pressure of the environment. Thus, a full, thickened barrier liner is maintained during the time period in which a consumer normally consumes the beverage.

FIGS. 5, 5A and 6 illustrate another embodiment of the present invention in the form of a thermal barrier liner 30 comprising a layer of base material 42 interspersed with an additive component 40 such as gas or liquid filled microcapsules. The base material 42 binds to the additive component 40 and ensures a continuous coating of the interior surface of the container.

The additive component 40 can either be a majority component or minority component by volume as compared to the base layer 42. As mentioned further below with respect to a method of applying the thermal barrier liner, the base material 42 and additive component 40 may be premixed into a single slurry and spray coated onto the interior surface of the container.

Preferably, the additive component is dispersed randomly throughout the base layer. Once the interior of the container is coated with the barrier liner, it is cured to optimize the thermal barrier properties. For example, the container can be oven dried to evaporate and otherwise remove any solvents or other substances used with the additive component during application to the container. This curing process can also be used to condition gas filled microcapsules. For example, heat applied to the container during curing can cause a controlled amount of expansion of the gas filled microcapsules so that the barrier liner is placed in a desired state prior to filling of the container.

One example of an additive component that may be used as a microencapsulated gas includes Expancel®. Expancel® is a commercially available product that includes elastic microspheres or microcapsules, roughly ten micrometers in diameter, filled with a small amount of liquid hydrocarbon. When heated within a known temperature range, the hydrocarbon liquid vaporizes to a gas state within the micro-spheres. The shells or casings of the micro-spheres expand as the gas expands within the micro-spheres. In the expanded state, the micro-spheres can expand to a diameter of four times the un-expanded state resulting in a volume increase of approximately forty times larger than the un-expanded size. The micro-spheres can be used either in an unexpanded state or a pre-expanded gaseous state, depending on application capabilities and the elasticity of the base material 42. With respect to use as an insulation material in the present invention, use of pre-expanded spheres for the additive component 40 would create a pattern of voids in the base layer.

As mentioned, the microcapsules create voids in the base layer and thereby enhance the thermal barrier capability of the liner. The size and distribution of the voids created by the gas or liquid filled spheres can be selected to provide the desired level of insulation for the container. A greater concentration of micro spheres will produce more voids. The particular gas or liquid selected can be selected to optimize the desired level of insulation.

In the event that the liner is applied to the interior of the container as by spray coating, one option is to activate the microspheres to their expanded state when the liner is cured. A drying oven can be used to cure the liner and the heat from the oven would result in activation of the microspheres to create the insulating voids.

It is also contemplated that liquid filled micro spheres can be provided so that the liquid changes phase to a gaseous state when the beverage warms during consumption by the consumer. Thus, when the beverage is maintained in its cooled state during storage, the micro-spheres would remain in a liquid state. Referring to FIG. 6, when the container is opened and exposed to the warmer environment, the increase in temperature causes the micro-spheres to transition to a larger diameter as the liquid changes phase to the gas state. Thus, the expansion of the thermal barrier liner in this example is activated by temperature and not by ambient pressure changes. A liquid-gas phase change property for the thermal barrier liner of the present invention may be particularly suited for containers that are not pressurized, such as juice, fruit, or vegetable containers.

For both the first and second embodiments, one acceptable base liner material 42 may include Valspar 9823-001 or ICI 640-C692CLS. Increased curing times may be required depending upon the addition of an additive component which may, therefore, increase the curing time.

Now referring to FIGS. 7, 7A and 8, in another embodiment of the present invention, a thermal barrier liner is provided comprising a base layer 42, and an additive component 40 in the form of encapsulated phase change material. The encapsulated phase change material 50 may also be microcapsules that are interspersed as shown within the base layer 42. One example of phase change material that may be used includes paraffinic hydrocarbons. Another phase change material may include hydrated salts. One commercially available type of phase change material may include MPCM-6, a product sold by MicroTek Laboratories, Inc. MPCM-6 is a microencapsulated paraffin wax (specific latent heat of 188.6 J/g) in a polymer shell with a solid to liquid phase change temperature occurring at 6° C. When chilled to below 6° C., the paraffin exists as a solid. As the spheres absorb heat, the encapsulated paraffin rises in temperature until it reaches 6° C. At that temperature, the paraffin continues to absorb heat, but stays at a relatively constant temperature until it has completely transitioned from a solid to a liquid phase. The heat absorbed by the phase change material, also known as latent heat, would otherwise have caused an increase in the temperature of the beverage within the container. The total amount of heat capable of being absorbed by the paraffin wax can be calculated and adjusted by varying the amount of paraffin used within the barrier layer. For example, 25 cc of MPCM-6, which would normally require a minimum liner thickness of one millimeter, absorbs the equivalent heat that would otherwise cause a 5° F. increase in temperature of a 355 cc beverage.

FIGS. 7 and 7A specifically illustrate this third embodiment wherein the container is under pressure and assumedly at a chilled temperature (for example below 6° C.). FIG. 8 shows the container when removed from refrigeration and warmed to a temperature wherein the solid phase change material has transitioned from a solid to liquid state. More specifically, the materials in the microcapsules 50 are shown in FIGS. 7 and 8 as transitioning from a solid state 51 to a liquid state 52.

Figures 9, 9A:
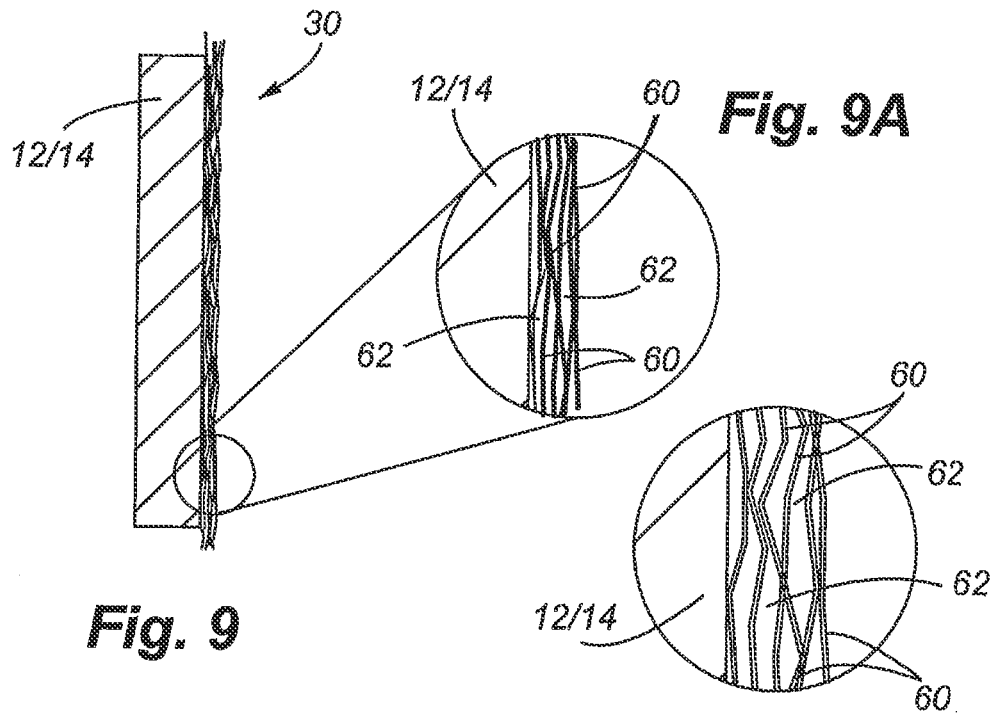
FIG. 9 is an enlarged fragmentary cross section view of another embodiment of the present invention illustrating a thermal barrier liner constructed of a multi-layer configuration and illustrating the container when sealed and pressurized.
FIG. 9A is a greatly enlarged view of the embodiment of FIG. 9 showing the multi-layer configuration when the container is sealed and pressurized.
Figure 10:
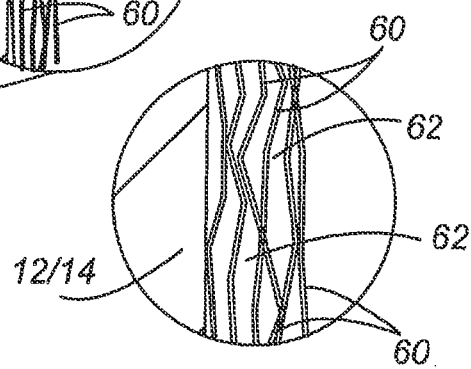
FIG. 10 is another greatly enlarged view of the embodiment of FIG. 9 illustrating the container after it has been opened and expansion in thickness of the liner.

FIGS. 9, 9A and 10 illustrate yet another preferred embodiment of the present invention. In this embodiment, the thermal barrier liner 30 comprises multiple layers 60 of a lining material wherein voids or gaps 62 exist between each of the layers. The voids or gaps between the layers may be provided in an irregular pattern. Thus, the layers do not lie evenly over one another and the layers extend non-linearly having continuous patterns of bends or curves in the liner material that form the voids or gaps 62. As shown in FIGS. 9 and 9A, when the container is under pressure and unopened, the layers 60 form a more compressed, thinner profile. However, as shown in FIG. 10, when the container is opened and ambient pressure is reduced, the gas trapped in the voids between the layers results in an expansion of the liner, thereby enhancing thermal barrier properties of the liner.

This multi-layer liner can be constructed of multiple layers of the same material, or may be made of dissimilar materials. With respect to a single material used, if the single material is applied at different times with different temperatures or viscosities, voids or gas pockets may be formed between layers. With respect to use of dissimilar materials, void areas between the layers may be formed more as a function of the ability of layers to adhere to one another, among other factors. Unlike conventional liners applied to the interior of containers, it is the intent in the embodiment shown in FIGS. 9 and 10 to apply a multi-layered liner wherein intentional voids or gaps are created between the layers of material such that gases may be trapped between the layers. Thus, as mentioned above, the variation of temperatures, viscosities, as well as use of dissimilar materials can result in the creation of a multi-layered liner having inconsistencies in how the layers adhere to one another. Visually, the liner of this embodiment may appear somewhat wrinkled or may appear as having a roughened surface. These apparent inconsistencies in the liner are a result of the intention to provide gaps or void spaces between the layers of the liner. Thus, this multi-layered liner significantly departs from multi-layered liners, either used internally or externally for containers, wherein the failure to completely adhere one layer to another may be considered a significant defect.

Figures 11, 12:
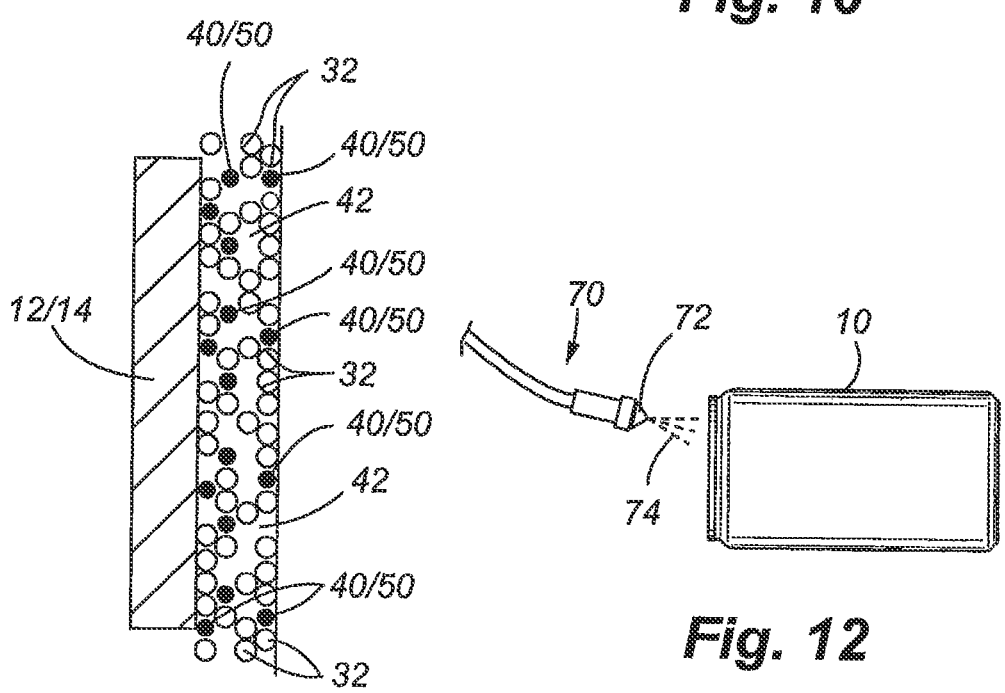
FIG. 11 illustrates yet another embodiment of the present invention in the form of a composite thermal barrier liner including a combination of features of the prior embodiments including a closed cell substrate, and encapsulated gas and/or encapsulated phase change material set within a base liner.
FIG. 12 is a schematic view of equipment used to apply the thermal barrier liner of the present invention as by spray coating.

Referring to FIG. 11, a composite thermal barrier liner may be provided by combining one or more of the attributes from the prior embodiments. More specifically, FIG. 11 illustrates a gas permeable closed cell substrate 32 being formed, as well as microencapsulated gas and/or microencapsulated solid-liquid phase change material 40/50 being set within a base layer 42.

Referring to FIG. 12, one method by which the thermal barrier liner may be applied to a container is by spray coating. Accordingly, FIG. 12 illustrates a spray coating device 70 positioned to apply a coating of material to form the thermal barrier liner. The spray coating device 70 may be conventional, as found in many container manufacturing lines. Accordingly, the coating device may include a nozzle 72 that directs an atomized spray 74 that forms the barrier liner 30. The containers can be rotated in the range of the spray 74 in order to ensure a uniform layer is applied to the container. The atomized spray can be pressurized and can also be airless meaning that the liquid spray does not require a pressurized entrained gas to deliver the spray. Since the barrier liner 30 is applied by spray coating, both the sidewalls and interior base of the container may be coated. With respect to the multi-layer embodiment illustrated in FIGS. 9, 9A and 10, a plurality of layers may be applied by separate spray coating steps, for example, a first coat is applied by a first spray coating device, and then additional layers are provided by other spray coating devices incorporated in series within the production line. As mentioned above, various temperatures and materials can be used to create the desired gap/void arrangement between the layers of materials.

Although spray coating the liner has been described as a preferred method of installing the liner, it is also contemplated within the present invention that a number of other manufacturing techniques may be used to incorporate the thermal barrier liner into the present invention. For example, the thermal barrier liner may be pre-made and then mechanically inserted within the container, or the interior liner of the container may be coated by contact with processing equipment that dispenses the thermal barrier liner and adheres or seals the liner to the interior of the container. Additionally, while spray coating may be advantageous for applying the liner to both the interior sidewall and interior surface of the base of the container, application of the liner to the base is optional. Further, while it may be advantageous to not require use of an adhesive to secure the thermal barrier liner to the interior of the container, such as when a spray coating process is used, in some liner installation techniques it may be advantageous to use some amount of adhesive.

With respect to a preferred thickness of the thermal barrier liner, it shall be understood that none of the embodiments are strictly limited to a specific range but it has been found that a liner between about 1.0 mm to 3.0 mm provides adequate insulation without displacing a quantity of the beverage that adversely affects desired headspace within the container. For the first embodiment, the thermal barrier liner can be between about 0.5 mm and 1.5 mm in thickness when the container is sealed and pressurized, and the thermal barrier liner expands to between about 1.0 mm and 3.0 mm when the container is opened and exposed to the environment.

For each of the embodiments of the present invention, it shall be understood that the thermal barrier liner 30 may be used as an additional layer applied to the interior surface of the container strictly for purposes of insulation, or may also serve as a combination of a conventional interior liner of the container to prevent undesirable contact between the beverage and the metallic sidewall and base, as well as a thermal insulating barrier. In order to improve adhesion of the liner to the sidewall of the container, a primer layer could be applied prior to applying the liner. Also, in order to create the liner having an adequate thickness, the spray coating may include two separate applications or passes wherein after the first coat or layer is applied, the container is air dried prior to applying the second layer. The container could then be dried/cured to complete the liner application process.

It shall be understood that the thermal barrier liner of the present invention significantly departs from traditional liners used to coat the interior of a container for purposes of preventing spoilage of the beverage in the container. More specifically, conventional liners are formed to create a very smooth, thin, and non-insulative layer. Thus, the thermal barrier liner of the present invention by provision of a closed cell substrate, and/or with micro-encapsulated materials, or a multi-layer liner provides a unique solution for a thermal barrier, yet at the same time still fulfills the need for providing a liner to prevent direct contact of the beverage with the metallic sidewall and base of the container.

As also mentioned above, provision of a gas permeable liner that can equilibrate between different ambient pressures allows creation of a thicker insulative layer once the container is opened. Providing this active or size changing barrier liner also has the benefit of allowing the container to be more easily cooled when unopened, yet allows substantially the same amount of beverage to be maintained in the container since the barrier liner occupies a minimum volume when under pressure or when chilled.

With respect to the embodiment of the present invention providing a multi-layered liner, the structure here is intended to provide voids between layers as opposed to material protective liners in which the intent is primarily to minimize void areas between the layers in order to maximize the bond between the layers. In fact, many can liners require additives therefore improving the wetting or contact area to maximize bonding between the layers. However, with the present invention, the bonding areas between the layers is reduced to the point where a balance can be achieved between a bond strength such that the layers maintain integrity and remain bound to one another, yet gaps or void areas are formed to allow permeation of gas and subsequent expansion thereby creating an effective thermal barrier liner. Some techniques to promote rough and irregular surface bonding between the layers may include use of high viscosity materials, cold application temperatures, and use of different materials between layers that are not fully miscible.

While the preferred embodiments of the present invention have been shown specifically with respect to a traditional aluminum or steel container, it shall be understood that the thermal barrier liners of the present invention can be incorporated within any type of container to include plastic containers such as PET bottles, or conventional aluminum or steel cans used to contain fruits, vegetables, soups, meat or other products.

Because the thermal barrier liner of the present invention is preferably formed with a liner material having some adhesive characteristic, it is unnecessary to provide a separate adhesive coating or layer in order to secure the thermal barrier liner to the interior surface of the container. Furthermore, as discussed above, the thermal barrier liner of the present invention may be used in addition to or to replace the traditional can liner used for purposes of preventing direct contact between the beverage and the interior surface of the container.

While the present invention has been discussed for use in keeping beverages cool, it shall also be understood that the present invention can also be used to thermally insulate a beverage intended to be served at room temperature or warmer. For the first embodiment of the present invention incorporating the closed cell substrate that is capable of thermally insulating a container by only changes in pressure, this embodiment can certainly be used for those beverages that are intended to be served at room temperature or warmer.

The automatic activation of the thermal barrier liner under variable pressure or temperature conditions makes the thermal barrier liner ideal in those commercial applications where the beverages may be stored under pressure, such as the case for carbonated soft drinks and beer.

Because the thermal barrier liner of the present invention may be applied using manufacturing techniques such as spray coating, it is unnecessary to significantly alter or otherwise modify known beverage packaging machinery or processes.

Figure 13:
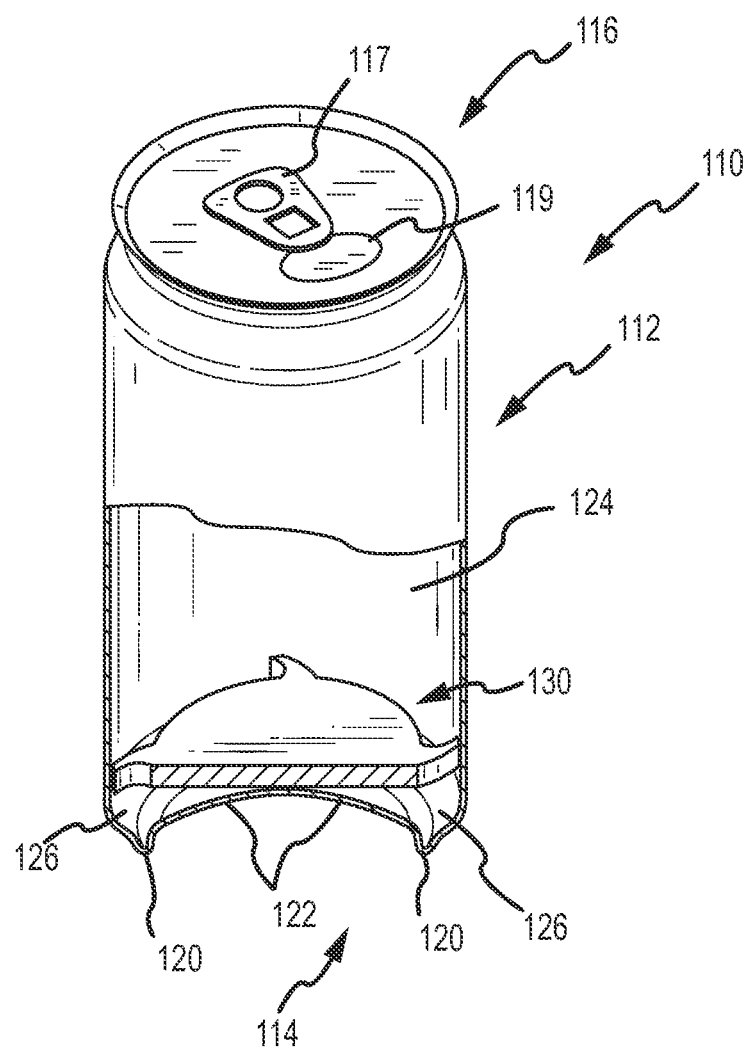
FIG. 13 is a fragmentary perspective view of a container incorporating a cooling element in accordance with the first embodiment of the present invention.

Referring to FIG. 13, a beverage container 110, particularly suited for beverages such as beer or carbonated soft drinks, is shown. The container is illustrated as a conventional beverage can having a sidewall or body 112, a base 114, and an openable top 116. The openable top 116 may include a closure mechanism, such as a pull-tab 117. The sidewall or body 112 of the container is constructed of conventional material such as aluminum or steel. The closure mechanism 117 is also preferably aluminum or steel and may include the pull-tab 117 that contacts a scored area 119 on the top 116. Activation of the pull-tab breaks the scored area creating an opening or mouth to provide access to the beverage inside the container. As also shown in FIG. 13, the base 114 may have an annular lip 120 and a dome shaped panel 122. A peripheral concave or curved area 126 resides between the lip 120 and the cylindrical sidewall 112.

Figures 14, 15:
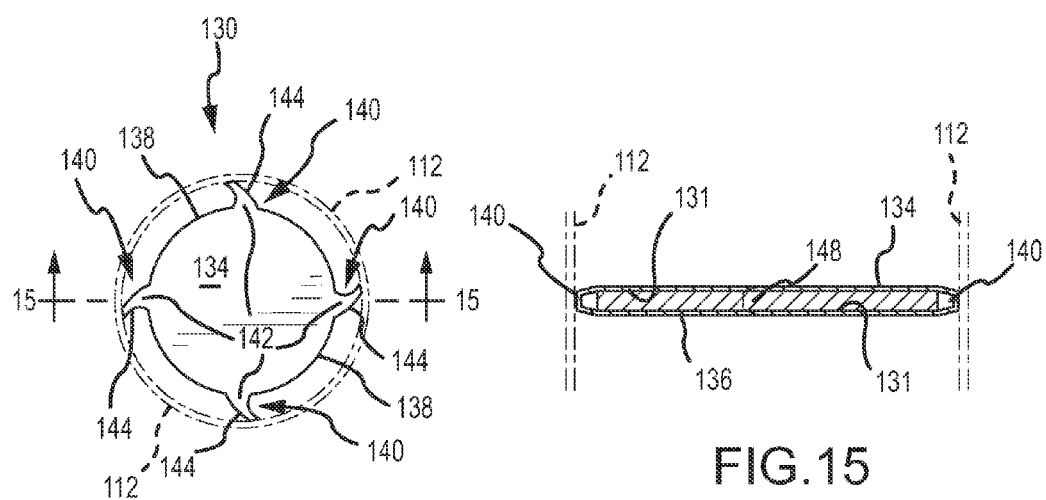
FIG. 14 is a plan view of the cooling element showing its relative size with respect to the diameter of the container and the manner in which the cooling element can engage the sidewalls of the container to maintain the cooling element at a desired position within the container.
FIG. 15 is an enlarged cross section taken along line 3-3 of FIG. 2.

In accordance with another embodiment of the present invention and also referring to FIGS. 14 and 15, the container incorporates a cooling element 130. The cooling element has an outer shell 131 or covering that encapsulates a quantity of phase change material 148 therein. As shown in these figures, the shell is very thin thereby minimizing any thermal insulation properties that would inhibit absorption of heat by the phase change material when the container is exposed to the warmer environment. In this first embodiment, the shape or configuration of the cooling element is provided such that it can be placed at a selected location within the container and maintained at that location without the requirement to use an adhesive to secure the element. The cooling element has a low profile defined by a very small thickness as compared to the overall height of the container. Thus, the cooling element 130 is a very non-obtrusive element that does not interfere with the normal flow of beverage from the container when the beverage is consumed. This low profile also makes the cooling element 130 more difficult to view by the consumer when the cooling element is secured adjacent to or in the base 114 of the container thereby limiting any distractions that could be associated with the viewing of the cooling element As shown in FIGS. 14 and 15, the cooling element 130 has a disc shaped body with an upper surface 134, a lower surface 136, and a peripheral edge 138. Extending from the peripheral edge 138 are a plurality of fins or extensions 140 that make contact with the interior surface 124 of the sidewall 112. In this embodiment, the lower surface 136 also preferably maintains contact with the interior surface of the dome 122. The extensions 140 are preferably made of the same material as the outer shell, and are flexible and resilient such that the extensions 140 maintain frictional contact with the interior surface 124. One preferred shape for the extensions are shown as curved members having pointed distal tips 144 and enlarged base portions 142 that connect to the body of the cooling element 130.

During production, the cooling element 130 may be installed by a cylindrical shaped mandrel (not shown). The mandrel may be inserted within the open top of the container 110. When the mandrel is removed, the spring action of the extensions 140 keeps the cooling element in place within the container by frictional engagement of the extensions 140 against the interior surface 124 of the sidewall 112.

While the fin shaped extensions are shown in this particular embodiment, it shall be understood that other shaped extensions may be provided to achieve the same purpose, namely, maintaining frictional engagement with the interior surface of the container thereby holding the widget in place without the requirement for use of an adhesive.

Referring to FIG. 15, the phase change material 148 fills the body. However, the fin shaped extensions 140 preferably do not have phase change material therein.

Figure 16:
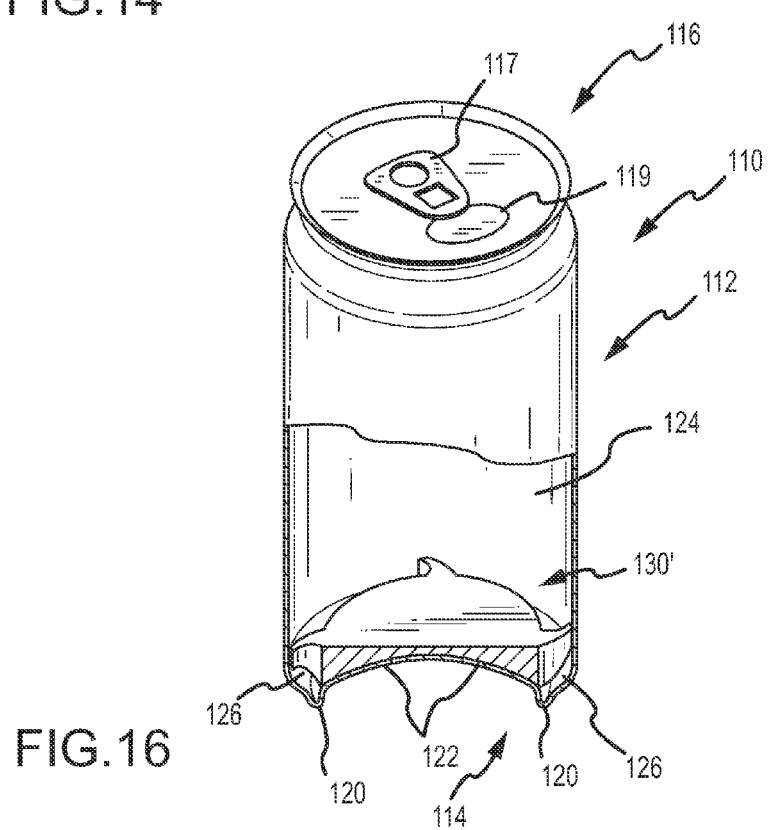
FIG. 16 is another fragmentary perspective view similar to FIG. 1, but illustrating the cooling element in a different configuration wherein the cooling element conforms to the lower dome of the container.

Referring to FIG. 16, a slightly different configuration is provided for the cooling element of the first embodiment wherein the cooling element 130' has a curved shape body that conforms to the dome shaped panel 122. The fin shaped extensions, however, still extend away from the body so that they extend substantially orthogonal or perpendicular with respect to the sidewall 112 of the container.

Figure 17:
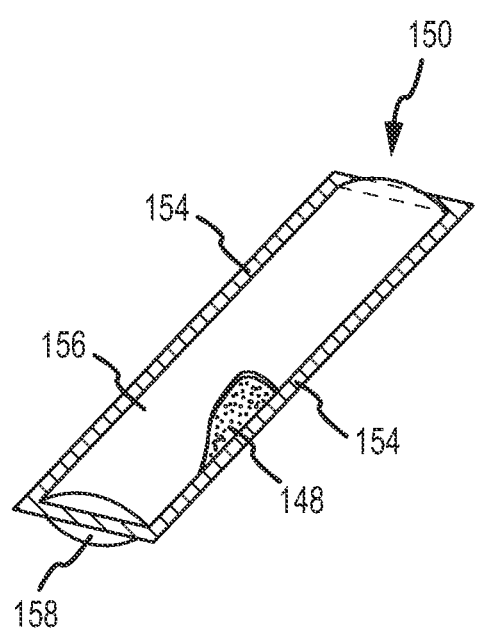
FIG. 17 is a fragmentary perspective view of a cooling element in another embodiment of the present invention wherein the phase change material is held within a flexible plastic film pouch.

Referring to FIG. 17, another embodiment of the present invention is illustrated wherein a cooling element 150 is a pouch or pocket having phase change material 148 therein. More specifically, the cooling element 150 may include an upper surface 156 formed from a first sheet of flexible plastic film and a lower surface 158 made from a second sheet of flexible plastic film. The two sheets of film material are sealed to one another along an exterior edge 154 of the pouch. In FIG. 17, a substantially rectangular shaped pouch is shown.

However, it shall be understood that the pouch may be configured in many different shapes to include round, or even a donut shaped pouch that frictionally engages the sidewalls of the container. In this second embodiment, the use of a flexible pouch containing the phase change material is very adaptable for placement into many different types and shapes of containers. The pouch may be shaped and sized to best accommodate the type of container that is to receive the cooling element.

Referring to FIG. 18, another embodiment is illustrated wherein a cooling element 160 more fully conforms to the dome shaped panel 122 of the base 114. As shown, the cooling element 160 has a generally flat upper surface and a curved lower surface in contact with the dome shaped panel 122. The curved peripheral edge 166 of the cooling element generally conforms to the lip 120. With this nested arrangement of the cooling element 160, the cooling element conveniently rests on the dome shaped panel 122 and is prevented from freely shifting within the container. As with the prior embodiments, the cooling element 160 contains a desired phase change material therein.

Referring to FIG. 19, another configuration for a cooling element is shown in the form of a cooling element assembly 170. This assembly 170 comprises a plurality of individual cooling elements 172 set within a supporting frame. As shown, the individual cooling elements 172 are separated from one another by radial arms 174 of the frame that extends from a central area 173. The peripheral edge 176 of the frame is sized to frictionally engage the interior sidewall of the container. Each of the cooling elements 172 has an exterior shell with encapsulated phase change material therein. Although this figure shows a cooling element residing in each gap between arms 174 of the frame, it shall be understood that a selected level of cooling may be obtained by simply choosing the number of cooling elements to be incorporated in the cooling element assembly. The frame having a continuous peripheral edge as well as the radial arms or spokes helps to create sufficient rigidity for the cooling element assembly so that it does not randomly shift within the container.

Referring to FIG. 20, another cooling element 180 is shown wherein the cooling element has an irregular shaped body 184 characterized by ruffled or uneven surfaces. A peripheral edge 182 of the cooling element forms a generally circular closed shape. This cooling element 180 can be sized so that at least some portions of the peripheral edge 182 contact the interior surface of the container thereby frictionally holding the cooling element in place. As with the other embodiments, an outer shell or covering of the cooling element houses a quantity of phase change material therein.

Referring to FIG. 21, yet another cooling element 190 is shown wherein the cooling element has a disc shaped body 192 sized to fit within the desired container. Accordingly, the peripheral edge 194 frictionally engages the interior surface of the container sidewall. The cooling element 190 also has an outer shell that houses a quantity of phase change material therein.

Referring to FIG. 22, another embodiment is shown in which a cooling element 200 is secured to the exterior of the container. More specifically, FIG. 22 illustrates a cooling element 200 that is secured to the exterior bottom side of the container 110, and the cooling element 200 conforms to the shape of the dome 122. Preferably, the thickness of the cooling element 200 is such that it does not protrude downward below the annular lip 120. Accordingly, the container 110 may still be placed on a flat surface in a steady manner, and the container 110 may be stacked on top of another container without substantial interference by the presence of the cooling element 200. The cooling element 200 may be constructed the same as the cooling elements in the other embodiments, namely, the cooling element has an outer shell or covering that encapsulates a quantity of phase change material therein. However, for the embodiment in FIG. 22, it may be desirable to provide the exposed lower surface of the cooling element 200 with a stiffer material to prevent breakage of the shell. For example, a selected thermoplastic having sufficient rigidity may be appropriate for many containers.

Referring to FIG. 23, another embodiment is illustrated in which a container 210 in the form of a glass container or bottle incorporates the cooling element 200. The bottle 210 is conventional, including vertical sidewalls 212, and a concave depression 214 formed at the bottom end thereof. Typically, the concave depression in a bottle is not as pronounced as the dome of a metal container. Therefore, a smaller cooling element 200 would be required in order to avoid the cooling element 200 protruding below the bottom annular area 216 of the container 210. The construction of the cooling element in FIG. 23 may be the same as described with respect to FIG. 22, including an exposed lower surface for the cooling element that may be relatively rigid in order to prevent inadvertent breakage of the cooling element.

Figure 24A:
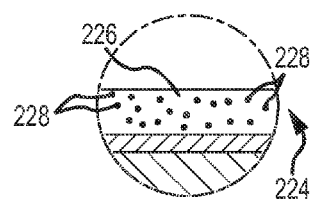
FIG. 24a is a greatly enlarged portion of FIG. 24 providing greater details of the applied layers.
Figure 24:
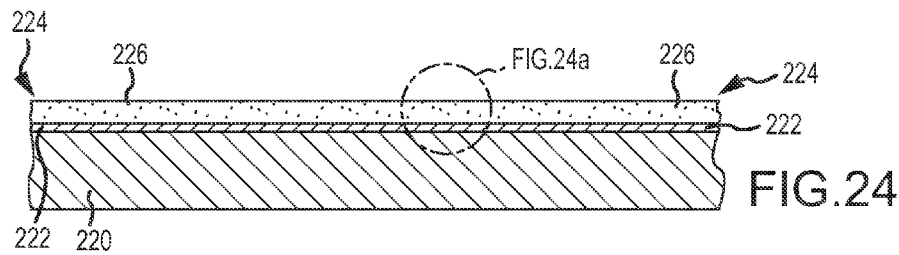
FIG. 24 is an enlarged cross-sectional view of a thermal barrier liner applied to a container exterior surface, along with a layer of thermochromatic ink that is placed between the container exterior surface and the thermal barrier liner.

Referring to FIGS. 24 and 24a, in yet another embodiment of the present invention, a thermal barrier liner 224 is applied over the exterior surface 220 of a container. The exterior surface 220 may be glass, plastic, metal, or any other material which may be used as a container. In the embodiment of FIG. 24, the thermal barrier liner may be the same as illustrated and described with respect to FIG. 7, namely a barrier liner that includes micro encapsulated phase change material shown in FIG. 24a as microcapsules 228 set within a base material 226. The base material could be, for example, a varnish material. In addition to the thermal barrier layer 224, an additional layer is illustrated, namely a thermochromatic ink layer 222. Thermochromatic or thermochromic inks or dyes are those chemical formulations that display color changes over specific temperature ranges. These inks or dyes may be manipulated to display desired colors over critical temperature ranges. Microencapsulation techniques have been developed to enable the use of thermochromatic inks to be applied in various printing processes. The thermochromatic pigments forming the thermochromatic ink are reversible in their color change such that a visible change in color occurs in response to a change in temperature, and the color change then reverses back to the original color when the temperature surrounding the thermochromatic ink returns to its original temperature.

One example of an acceptable thermochromatic ink that can be used in the present inventions includes those disclosed in the U.S. Pat. No. 5,997,849, this reference being incorporated by reference for purposes of disclosing possible thermochromatic ink formulations.

One advantage of incorporating the thermochromatic ink layer 222 in the invention shown in FIG. 24 would be to allow a consumer to view the temperature state of the beverage within the container. Further, the thermochromatic ink could be used for purposes of enhancing the visual appearance of container graphics, and to otherwise supplement a desired presentation of the beverage at various temperatures.

Figure 25:
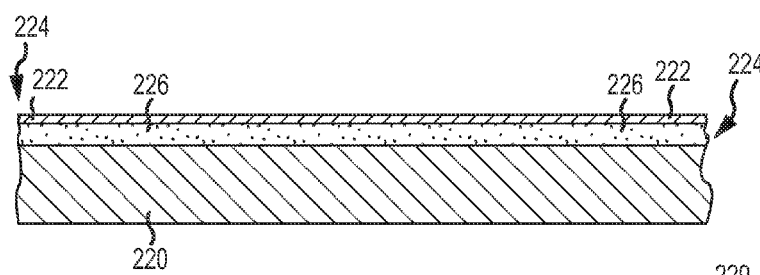
FIG. 25 is another cross-sectional view similar to FIG. 24; however, the thermochromatic ink layer is applied over the thermal barrier liner.

Referring to FIG. 25, yet another cross-section is shown of a container that incorporates both a thermal barrier liner as well as a thermochromatic ink layer. In FIG. 25, instead of the thermal ink layer being disposed between the barrier liner and exterior surface of the container, the thermochromatic ink layer 222 is applied over the thermal barrier liner/layer 224.

Therefore, the thermochromatic ink layer 222 is exposed. Placing the thermochromatic ink layer 222 as the exposed layer may be advantageous and some packaging considerations, including the use of some labels that may be placed over the container in which the thermochromatic layer may be more easily viewed by a consumer in conjunction with graphics contained on the label. For example, a label (not shown) applied over the ink layer 222 may have gaps or holes which expose the thermochromatic ink layer 222 in order to enable a consumer to view the temperature characteristics of the beverage. Further, the label itself may be constructed of a material which enables the color of the thermochromatic ink layer 222 to react with colors within the label to provide a desirable visual effect for the consumer. For example, a translucent or clear label with graphics incorporated thereon may more easily allow the color characteristics of the ink layer to be viewed by a consumer.

Figure 26A:
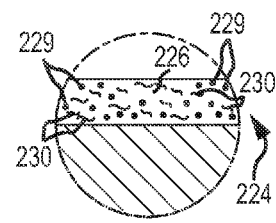
FIG. 26a is a greatly enlarged portion of FIG. 26 providing greater details of the applied composite layer.
Figure 26:
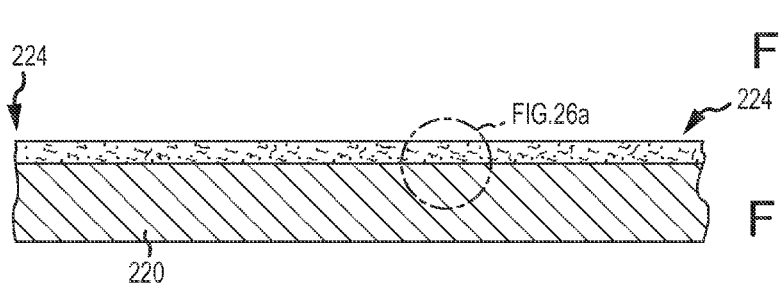
FIG. 26 is yet another cross-section view similar to FIG. 24 showing a thermal barrier liner applied to the exterior surface of the container; however, the thermochromatic ink material is mixed directly within the thermal barrier layer thereby producing a composite thermal barrier liner incorporating a mixture of the thermochromatic ink.

Referring to FIGS. 26 and 26a, yet another embodiment is shown of a composite thermal barrier layer 224, which incorporates encapsulated phase change material 229, and further where a thermochromatic formulation 230 is directly incorporated in the thermal barrier layer 224. Accordingly, FIG. 26 is intended to represent a thermal barrier layer 224 having a composite mixture in which the thermochromatic dyes are mixed with the base layer 226. FIG. 26a illustrates the thermochromatic dyes as small discrete elements 230, but it should be understood that the character of the thermochromatic dyes can be such that the base material 226 and thermochromatic dyes form a substantially homogeneous mixture.

Figure 27:
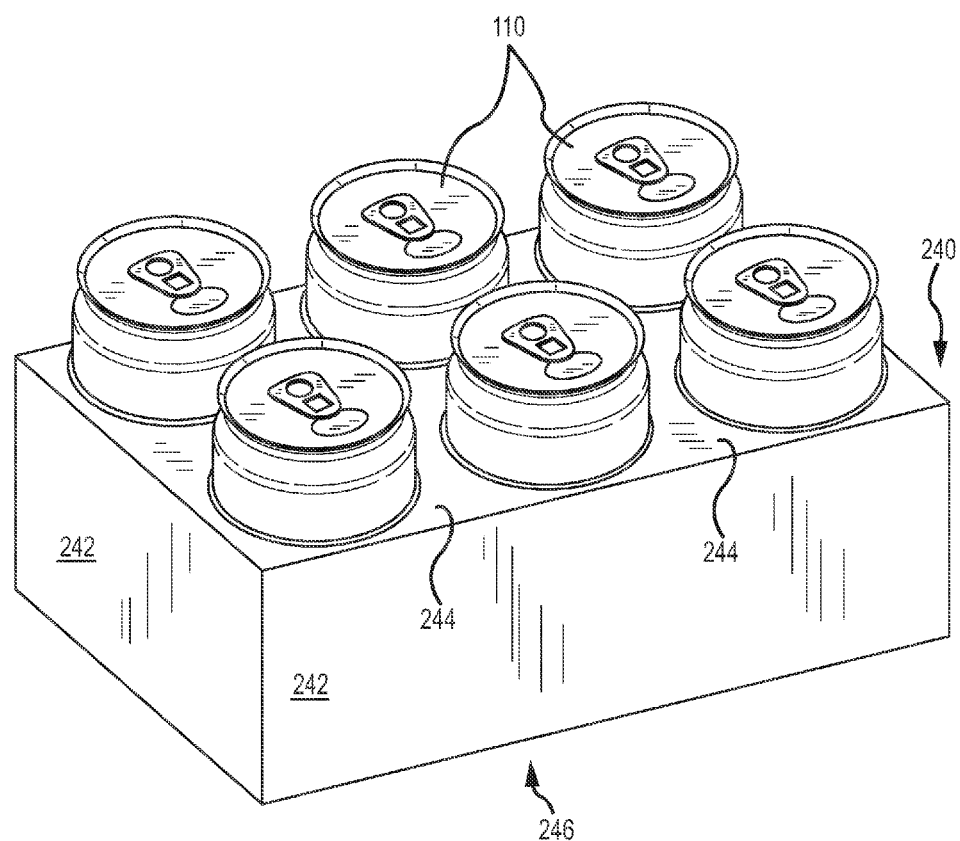
FIG. 27 is a perspective view of a container holder incorporating phase change material for maintaining containers secured in the container holder at a desired temperature.
Figure 28:
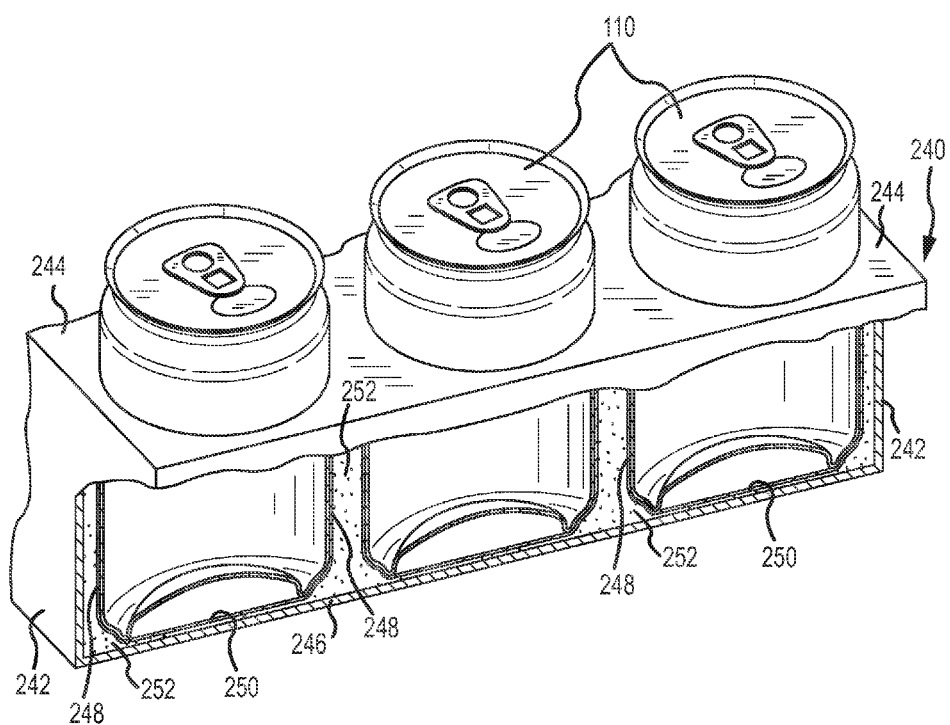
FIG. 28 is a greatly enlarged fragmentary perspective view of the container holder shown in FIG. 27, specifically showing the construction of the container holder including gaps between the layers of the materials making up the holder filled with phase change material, and optionally also mixed with thermochromatic ink.

Referring to FIGS. 27 and 28, yet another embodiment of the invention is shown in the form of container holder 240 that is especially adapted for holding one or more containers 110 prior to serving the same to consumers. The container holder 240 may therefore be used as an intermediate container storage device that is intended to maintain beverages at a desired temperature just prior to serving the beverage to a consumer. Establishments such as bars or restaurants would be likely candidates for use of the holder, or vendors at entertainment or sporting events could also utilize the holder 240. Structurally, the holder is characterized by a plurality of enclosing sidewalls 242, an upper surface 244 and a lower surface 246. A plurality of cavities defined by shaped interior walls 248 and integral bottom surfaces 250 receive one or more containers 110. The holder 240 can be adapted to receive various shaped containers by modifying the shapes of the walls 248 and bottom surfaces 250. Referring to FIG. 28, further structural details are shown in which gaps or spaces 252 are found between the cavities and the enclosing sidewalls 242 and lower surface 246. These gaps are filled with phase change materials, such as microencapsulated phase change materials set within a base material. The microencapsulated phase change and base materials can be the same as described with respect to the embodiment of FIG. 24 or FIG. 26. During construction of the holder 240, the selected base material may be in a heated liquid form which has the microencapsulated phase change materials therein. The heated liquid could be injected in the gaps 252. The heated liquid would then cool to a solid, forming a substantially rigid thermal barrier structure filling the gaps 252.

The holder 240 is preferably reusable. Once the beverages have been distributed from the container holder, the holder may then be returned to a refrigerator/freezer to again cool the phase change material below its threshold phase change temperature. Once cooled, the container holder is then ready for re-use to cool beverage containers.

For the embodiment of FIGS. 27 and 28, it is contemplated that two holders 240 could be used in a clam-shell configuration. That is, one holder 240 holds the lower half or part of a beverage, and another holder 240 covers the upper portion or halves of the container. Therefore, in this clam shell arrangement, a pair of holders 240 could be used to completely cover the containers prior to distribution to a consumer.

Figure 29:
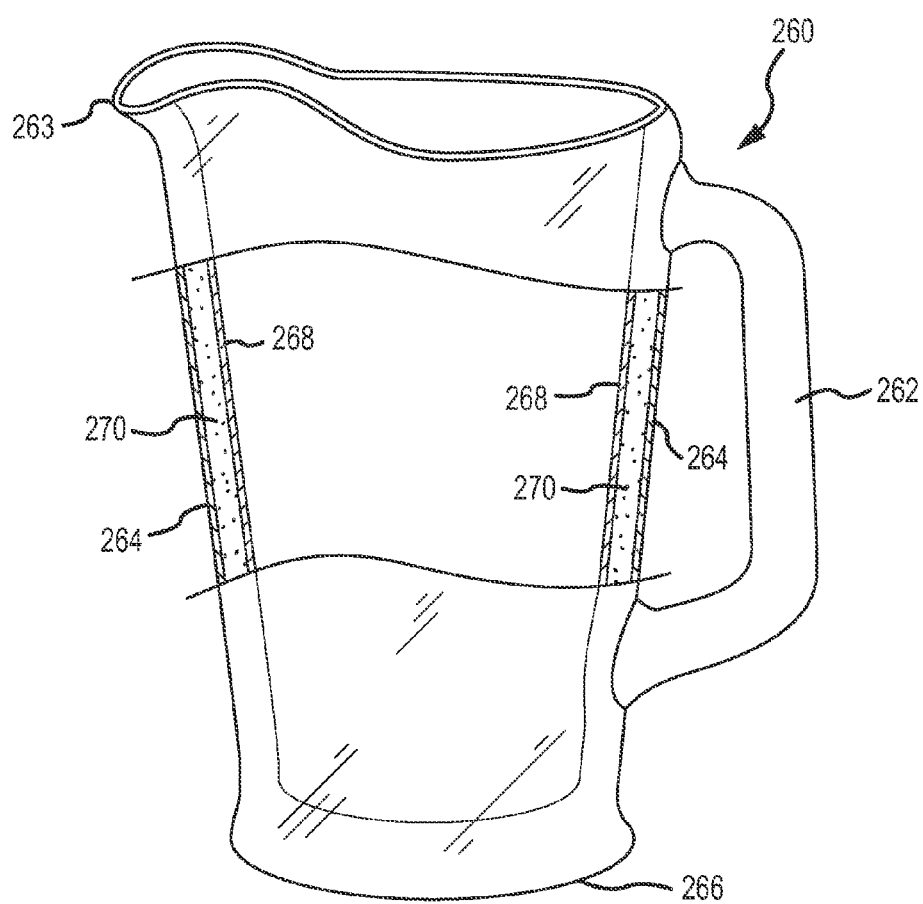
FIG. 29 is a fragmentary cross-sectional view of a beverage holder in the form of a beverage pitcher having a double walled construction with phase change material filling the gap between the walls.

Although FIGS. 27 and 28 illustrate a holder 240 having a plurality of compartments or cavities to receive multiple beverages, it is also contemplated that a temperature controlled holder could directly receive a beverage. Accordingly, referring to FIG. 29, a double walled pitcher 260 is provided in which phase change materials set within a base material fills the space 270 between the double walled pitcher. The pitcher 260 has a handle 262, a pour spout 263, and a base 266. More specifically, FIG. 29 shows the pitcher 260 having an interior wall 268 and an exterior wall 264 spaced from the interior wall 268 by the gap 270. The phase change material and base material are sealed between the interior and exterior walls enabling the pitcher to be re-used.

In each of the embodiments of the present invention, it is contemplated that one or more phase change materials may be used to maintain cooling for the particular beverage. For beverages that may take a consumer longer to consume, it may be beneficial to provide two or more different types of phase change material wherein the phase change for each material occurs at different temperatures so as the beverage continues to warm, the different phase change materials absorb heat over a greater range of temperatures and over a greater period of time.

One commercially available manufacturer of phase change materials is MicroTek Laboratories, Inc. of East River Road, Dayton, Ohio. As mentioned above, two acceptable types of phase change materials may include various paraffin complexes, as well as hydrated salts.

One particular phase change material sold by MicroTek Laboratories, Inc. is MPCM. MPCM is an encapsulated paraffin wax (heat capacity of 188.6 J/g) in a polymer shell with a solid to liquid phase change temperature of 6° C. When chilled to below 6° C., the paraffin exists as a solid. As the encapsulated paraffin wax absorbs heat, the paraffin wax rises in temperature until it reaches 6° C. At that temperature, the paraffin wax continues to absorb heat but stays at a relatively constant temperature until it has completely transitioned from a solid to a liquid phase. The heat absorbed by the phase change (latent heat) helps to maintain the beverage at a cooler temperature.

The total amount of heat required to be absorbed in order to maintain the beverage at a desired chilled temperature can be calculated and adjusted based upon the amount of phase change material being used. In this example, 25 cc of MPCM absorbs the equivalent heat that would otherwise cause a 5° F. increase in the temperature of a 355 cc beverage.

The cooling element in the embodiments is preferably relatively small and therefore does not materially affect the amount of beverage that can be placed within standard sized containers. As mentioned, the volume of the cooling element can be compensated for by slightly reducing the amount of headspace and/or the volume of the beverage within the container. As also mentioned, some of the preferred embodiments secure the cooling element to the base of the container thereby minimizing the consumer's ability to observe the cooling element and therefore minimizing any distractions a consumer may associate with the presence of the cooling element.

While the present invention has been disclosed above with respect to cooling elements having particular size or configuration, it shall be understood that other shapes and sizes of the cooling elements can be provided, the only relevant limitation being that the cooling element should be large enough to prevent the widget from passing through the container opening. Thus, while it may be preferable to provide a widget that frictionally engages the sidewalls or base of the container, it is also contemplated that the widget could be free floating within a container. Depending upon the density of the widget, it could therefore either float near the surface of the beverage or sink to the base.

In each of the embodiments of the present invention, it is also important to use materials that are compatible with the particular beverage and container such that there are no adverse chemical reactions that take place including reactions or mere exposure that may alter the flavor of the beverage. Further, in the event that the outer protective shell or covering of the cooling element breaks or is otherwise compromised, it is also important to make use of phase change material that is also non-toxic and cannot harm the consumer. It is also desirable to provide a shell or casing material that is non-reactive with the beverage, and is also a barrier that prevents migration of phase change material into the beverage, and vise versa. Thus, the shell material should be non-permeable with respect to the beverage in the container.

While the preferred embodiments of the present invention have been shown specifically with respect to a traditional aluminum or steel container, it shall be understood that the cooling element can be incorporated within any type of container to include plastic containers, such as PET bottles or conventional aluminum or steel cans used to contain other products such as juices, fruits and vegetables.

While the present invention has been described with respect to various preferred embodiments, it shall be understood that various other changes and modifications to the invention may be made, commensurate with the scope of the claims appended hereto.

What is claimed is:

1. An insulated container comprising:
a sidewall, a base connected to the sidewall, and a top forming an upper portion of the container;
a composite thermal barrier liner applied to an interior surface of said sidewall, said composite thermal barrier liner comprising: a base material and a plurality of microcapsules containing at least one of a gas or a liquid therein and wherein the microcapsules are dispersed in said base material, said composite thermal barrier liner having a surface in contact and adhered to the interior surface of said sidewall and said base; and
wherein said microcapsules are activated to expand by exposing the microcapsules to heat, and the expanded microcapsules create voids in the base material.

2. The container, as claimed in claim 1, wherein:
said composite thermal barrier liner is applied to the interior surface of said sidewall and said base by spraying.

3. The container, as claimed in claim 1, wherein:
said base material is made of a thermoplastic material that is elastic.

* * * * *